(12) United States Patent
Kawai et al.

(10) Patent No.: US 11,143,235 B2
(45) Date of Patent: Oct. 12, 2021

(54) TAPERED ROLLER BEARING

(71) Applicant: NTN CORPORATION, Osaka (JP)

(72) Inventors: Takashi Kawai, Shizuoka (JP); Tomoki Matsushita, Shizuoka (JP)

(73) Assignee: NTN CORPORATION, Osaka (JP)

( * ) Notice: Subject to any disclaimer, the term of this patent is extended or adjusted under 35 U.S.C. 154(b) by 95 days.

(21) Appl. No.: 16/082,044

(22) PCT Filed: Mar. 7, 2017

(86) PCT No.: PCT/JP2017/009065
§ 371 (c)(1),
(2) Date: Dec. 11, 2019

(87) PCT Pub. No.: WO2017/159467
PCT Pub. Date: Sep. 21, 2017

(65) Prior Publication Data
US 2020/0191197 A1 Jun. 18, 2020

(30) Foreign Application Priority Data

Mar. 18, 2016 (JP) .............................. JP2016-055517
Aug. 30, 2016 (JP) .............................. JP2016-168147

(51) Int. Cl.
*F16C 19/36* (2006.01)
*F16C 33/46* (2006.01)
*F16C 33/36* (2006.01)

(52) U.S. Cl.
CPC .......... *F16C 19/364* (2013.01); *F16C 33/366* (2013.01); *F16C 33/4623* (2013.01); *F16C 33/4676* (2013.01)

(58) Field of Classification Search
CPC ................ F16C 33/366; F16C 33/4623; F16C 33/4629; F16C 33/4635; F16C 33/4676; F16C 43/083
See application file for complete search history.

(56) References Cited

U.S. PATENT DOCUMENTS 8,858,088 B2 * 10/2014 Fujiwara ................. F16C 33/36
384/568
2009/0003745 A1 1/2009 Tsujimoto
(Continued)

FOREIGN PATENT DOCUMENTS

DE 10 2005 058 152 7/2007
JP 10-184697 7/1998
(Continued)

OTHER PUBLICATIONS

International Search Report dated Jun. 6, 2017 in International (PCT) Application No. PCT/JP2017/009065.
(Continued)

*Primary Examiner* — James Pilkington
(74) *Attorney, Agent, or Firm* — Wenderoth, Lind & Ponack, L.L.P.

(57) ABSTRACT

Two projecting portions (45a and 45b) configured to guide a tapered roller (3) on distal end surfaces thereof are formed on a side surface (43a) of a pillar portion (43) of a retainer (4) so as to be separated apart from each other in a roller axis direction. The projecting portions (45a and 45b) are separated apart from each other in the roller axis direction with respect to both a small-diameter-side annular portion (41) and a large-diameter-side annular portion (42). The projecting portions (45a and 45b) each have a force-fit margin (F).

18 Claims, 18 Drawing Sheets

(56) References Cited

U.S. PATENT DOCUMENTS

| | | | |
|---|---|---|---|
| 2011/0123143 A1* | 5/2011 | Lee | F16C 33/4676 384/572 |
| 2013/0089285 A1 | 4/2013 | Shimizu | |
| 2013/0171914 A1 | 7/2013 | Fujimoto et al. | |
| 2016/0052100 A1 | 2/2016 | Fujimoto et al. | |
| 2016/0084311 A1* | 3/2016 | Dittmar | F16C 19/22 384/572 |

FOREIGN PATENT DOCUMENTS

| | | |
|---|---|---|
| JP | 11-82519 | 3/1999 |
| JP | 2004-293698 | 10/2004 |
| JP | 2006-029522 | 2/2006 |
| JP | 2006-329260 | 12/2006 |
| JP | 2007-57075 | 3/2007 |
| JP | 2013-076429 | 4/2013 |
| WO | 2005/111446 | 11/2005 |
| WO | 2012/002247 | 1/2012 |
| WO | 2012/036062 | 3/2012 |

OTHER PUBLICATIONS

Extended European Search Report dated Sep. 11, 2019 in corresponding European Application No. 17766468.7.
International Preliminary Report on Patentability dated Sep. 18, 2018 in International (PCT) Application No. PCT/JP2017/009065.

* cited by examiner iii-iii (LARGE-DIAMETER SIDE)

iv-iv (LARGE-DIAMETER SIDE)

ii-ii (SMALL-DIAMETER SIDE)

i-i (SMALL-DIAMETER SIDE)

FIG. 19A
FIG. 19B
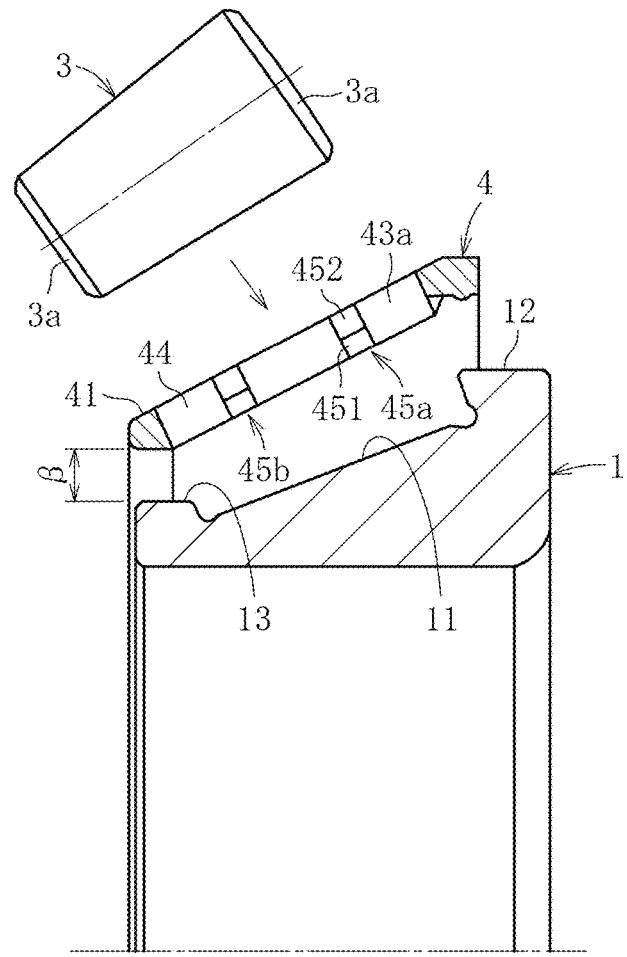
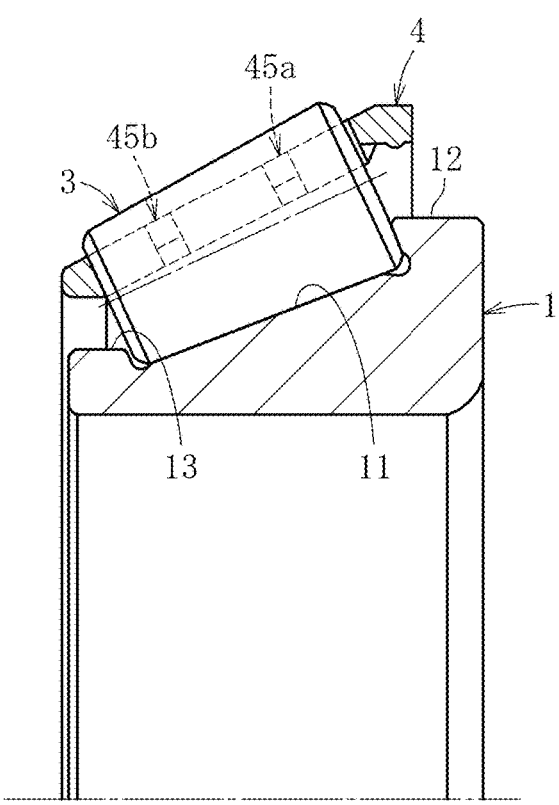
FIG. 20
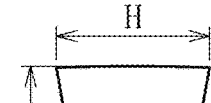

TAPERED ROLLER BEARING

TECHNICAL FIELD

The present invention relates to a tapered roller bearing in which tapered rollers are used as rolling elements.

BACKGROUND ART

A retainer formed of a steel plate which is to be used for a tapered roller bearing is manufactured through a procedure including, as illustrated in FIG. 24, (i) a blank punching step of punching out a circular blank from a steel plate, (ii) a drawing step of drawing the circular blank into a truncated cone-like cup shape, (iii) a center punching step of punching a bottom of the cup to form a center guide hole and a rotation guide hole, (iv) a pocket punching step of punching a side wall of the cup to form pockets each having a trapezoidal shape, (v) a pillar pressing step of forming tapered guide surfaces, which are to be held in contact with outer peripheral surfaces of the tapered rollers, on side surfaces of pillar portions, and (vi) a radially inner part punching step of punching the bottom of the cup while leaving a rim unpunched (see Patent Literature 1).

Hitherto, assembling of the tapered roller bearing including the retainer formed of a steel plate is performed, as illustrated in FIG. 25A, through a procedure of forming an assembly in which tapered rollers 103 are incorporated into pockets 121 of a retainer 104 and thereafter assembling the assembly to an outer peripheral side of an inner ring 101. At the time of performing such assembling, it is required that a small-diameter-side flange portion 113 of the inner ring 101 be moved to a radially inner side of an annular array of the tapered rollers. However, as illustrated in FIG. 25B, the tapered rollers 103 are held in contact with tapered guide surfaces 123 of the pillar portions 122 of the retainer 104 and mostly cannot move to a radially outer side. Thus, with such configuration, the small-diameter-side flange portion 113 interferes with radially inner ends of the tapered rollers 103, with the result that there is difficulty in assembling the assembly to the inner ring 101.

In view of such circumstances, in the related art, the pillar portions 122 of the retainer 104 are plastically deformed radially outward as illustrated in FIG. 26A, and positions of the tapered rollers 103 are shifted radially outward as illustrated in FIG. 26B, to thereby form an assembly. Then, the small-diameter flange portion 113 of the inner ring 101 is moved to the radially inner side of the tapered rollers 103. After that, as illustrated in FIG. 26C, the pillar portions 122 are plastically deformed radially inward by caulking from the radially outer side to restore the retainer 104 into an original shape (for example, see Patent Literature 2).

CITATION LIST

Patent Literature 1: JP 2004-293698 A
Patent Literature 2: JP 2006-29522 A
Patent Literature 3: JP 2013-76429 A

SUMMARY OF INVENTION

Technical Problem

However, with the method of plastically deforming the steel retainer radially outward before assembling of the tapered rollers and then plastically deforming the retainer radially inward to restore the retainer into the original shape after the assembling of the tapered rollers, residual deformation may occur, with the result that the shape of the pocket after the plastic deformation becomes unstable. Thus, there is a risk of causing contact failure between the tapered roller and a pocket inner surface of the retainer during rotation of the bearing. In order to solve the problems described above, according to the disclosure of Patent Literature 2, a slit is formed on a small-diameter side of the pillar portion of the retainer to reduce the rigidity of the pillar portion, thereby enabling incorporation of the retainer into the inner ring within a range of elastic deformation. However, there is difficulty in forming the slit with existing press machines, and hence the working cost increases. Moreover, there is a problem in that formation of the slit becomes more difficult when the tapered roller bearing has a small size.

Therefore, the present invention has an object to provide a tapered roller bearing which is capable of eliminating need for a caulking step of caulking a retainer at the time of assembling of a bearing, and preventing contact failure between the retainer and a tapered roller.

Solution to Problem

As a technical measure to achieve the above-mentioned object, according to one embodiment of the present invention, there is provided a tapered roller bearing, comprising: an inner ring having an inner raceway surface formed on an outer peripheral surface thereof; an outer ring having an outer raceway surface formed on an inner peripheral surface thereof; a plurality of tapered rollers arranged between the inner raceway surface of the inner ring and the outer raceway surface of the outer ring; and a retainer configured to retain the tapered rollers at a plurality of positions in a circumferential direction, wherein the retainer comprises: a small-diameter-side annular portion; a large-diameter-side annular portion; and a plurality of pillar portions connecting the small-diameter-side annular portion and the large-diameter-side annular portion to each other, wherein the tapered rollers are each received in a pocket which is defined by the small-diameter-side annular portion, the large-diameter-side annular portion, and adjacent two pillar portions of the retainer, wherein a plurality of projecting portions, which are separated apart from both the small-diameter-side annular portion and the large-diameter-side annular portion in a roller axis direction and are configured to guide the tapered roller on distal end surfaces thereof, are formed on a side surface of each of the pillar portions of the retainer so as to be separated apart from each other in the roller axis direction, and wherein the projecting portions each have a force-fit margin. This retainer can be formed of, for example, a steel plate.

The projecting portions each have a force-fit margin, and hence the tapered roller can be incorporated into the retainer through force-fitting. In addition, the projecting portions are separated apart from both the small-diameter-side annular portion and the large-diameter-side annular portion of the retainer in the roller axis direction, and the projecting portions are formed so as to be separated apart from each other in the roller axis direction. Thus, an area of the guide surfaces forming part of the distal end surfaces of the projecting portions becomes smaller, and hence the projecting portions and the pillar portions become more likely to be elastically deformed at the time of force-fitting. Thus, the tapered roller can be smoothly force-fitted to the retainer pocket. For the reasons described above, at the time of assembling of the bearing, there can be employed an assembling procedure such as force-fitting of the tapered roller from the radially outer side of the retainer under the state in which the retainer is arranged on the outer peripheral side of the inner ring, and hence the need for caulking the retainer at the time of assembling of the bearing is eliminated. Thus, the contact failure between the tapered roller and the pocket inner surface due to plastic deformation failure at the time of caulking can be prevented.

It is preferred that a guide portion formed of a fracture surface be formed on a radially outer side of each of the distal end surfaces of the projecting portions. The projecting portion can be formed by, for example, shearing. However, there is a clearance between a punch and a die used for shearing, and hence the fracture surface is inclined so as to retreat on the radially outer side (amount of projection into an inner side of the pocket is reduced). Therefore, a distance between fracture surfaces of the projecting portions opposed to each other in a circumferential direction becomes larger in a region serving as an inlet side at the time of force-fitting (region on the radially outer side) than in a region serving as an outlet side at the time of force-fitting (region on the radially inner side). Thus, the fracture surface may function as the guide portion configured to guide the force-fitting direction of the tapered roller, and hence the force-fitting resistance can be reduced.

The radially-inner-side region of the distal end surface of the projecting portion functions as the guide surface to be brought into contact with an outer peripheral surface of the tapered roller. Thus, when the radially-inner-side region is formed of a molded surface, the precision of the radially-inner-side region is enhanced, thereby being capable of stabilizing rolling of the tapered roller.

When a width A of the projecting portion and an entire width B of the pocket are set so as to satisfy a relationship of B/A=4.5 to 20, occurrence of roller removal and roller damage at the time of force-fitting can be prevented.

When a width C of center portions of the guide surfaces and the entire width B of the pocket are set so as to satisfy a relationship of C/B=0.45 to 0.55, occurrence of the roller removal and roller damage during operation of the bearing can be prevented.

It is preferred that a force-fit margin F of the projecting portion be set so as to be equal to or larger than 0.05 mm and equal to or smaller than 0.30 mm.

Moreover, when the force-fit margin F and a roller diameter G are set so as to satisfy a relationship of G/F=30 to 50, occurrence of the roller removal and the roller damage at the time of force-fitting can be prevented.

A retainer made of resin for the tapered roller bearing is manufactured by injection molding of a resin material such as polyamide. In the related art, assembling of the tapered roller bearing including the retainer made of resin is performed by, under a state in which tapered rollers are placed in pockets of the retainer to form an assembly, press-fitting the inner ring on a radially inner side of the assembly and thereafter assembling an outer ring to the radially outer side of the assembly. Press-fitting of the inner ring to the assembly is performed by pressing the small-diameter end portion of the tapered roller against the small flange portion of the inner ring, moving the tapered roller to the radially outer side with a press-fitting force, and elastically widening the retainer (for example, Patent Literature 3).

Incidentally, as illustrated in FIG. 27, the pocket punching step for the retainer formed of a steel plate is performed by, under a state in which a blank material 4' is arranged along an inner periphery of a die 6, simultaneously moving punches 7 having a shape corresponding to the shape of the pockets from a radially inner side toward a radially outer side of the blank material 4' and punching some regions of the blank material 4' with the punches. At the time of performing this pocket punching, it is required to prevent punching resistance from becoming excessively larger with respect to a receiving area of the die 6. For such reason, in the existing retainer formed of a steel plate, a cross-section height "t" and a pillar width H of the pillar portion are set so as to satisfy H/t≥1.5. This means that the pillar width becomes relatively larger. Thus, in the retainer made of a steel plate, there is difficulty in increasing a roller filling ratio, and hence increase in load capacity is limited.

Moreover, with the retainer made of resin in the related art, when the inner ring is to be assembled to the assembly including the retainer and the tapered rollers as described above, the tapered rollers slide while being strongly held in abutment against the small flange portion of the inner ring made of steel. Thus, there is a risk in that the surface of the tapered roller is damaged.

In view of the foregoing, in order to provide a tapered roller bearing which is capable of obtaining a high strength and a high roller filling ratio, and of suppressing occurrence of roller damage at the time of assembling of the bearing, it is preferred that, in the tapered roller bearing described above, the retainer be made of resin, and that a cross-section height "t" and a pillar width H of the pillar portion satisfy a relationship of H/t<1.5.

The retainer made of resin has pockets molded therein. Therefore, in view of the punching resistance, it is not required that the pillar width H or the cross-section height "t" be determined. Thus, the pillar width H can be set relatively small with setting satisfying the relationship of H/t<1.5. With this, the roller filling ratio can be increased to achieve a high load capacity of the bearing. At the time of the force-fitting, the tapered rollers slide relative to the projecting portions. However, this is the sliding relative to the resin component, and hence, as compare to the case of sliding of the tapered rollers with the small-diameter-side flange portion of the steel inner ring, the damage on the surface of the tapered rollers can be prevented. Based on the reasons described above, a high strength and a high roller filling ratio can be obtained, and the occurrence of the roller damage at the time of assembling of the bearing can be suppressed. Moreover, contact failure between the tapered roller and the pocket inner surface is prevented, thereby being capable of improving the bearing performance.

In the retainer made of resin, when the pillar portions of the retainer are arranged on a radially outer side with respect to a roller pitch circle, it is not required to consider the retainer strength on the roller pitch circle. Thus, the roller filling ratio can be increased more easily. In this case, the radially-inner-side regions of the distal end surfaces of the projecting portions function as guide surfaces in contact with outer peripheral surfaces of the tapered rollers.

Moreover, in the retainer made of resin, when a width A of the projecting portion and an entire width B of the pocket are set so as to satisfy the relationship of B/A=4.5 to 20, occurrence of the roller removal and the roller damage at the time of force-fitting can be prevented. When a width C of center portions of the guide surfaces and the entire width B of the pocket are set so as to satisfy the relationship of C/B=0.45 to 0.55, occurrence of the roller removal and the roller damage during operation of the bearing can be prevented. It is preferred that the force-fit margin F of the projecting portions be set so as to be equal to or larger than 0.20 mm and equal to or smaller than 0.50 mm. Moreover, when the force-fit margin F and the roller diameter G are set so as to satisfy the relationship of G/F=30 to 50, the roller removal and the occurrence of the roller damage at the time of force-fitting can be prevented.

In the tapered roller bearings described above, it is preferred that a logarithmic crowning be used as a crowning for the tapered rollers. When the logarithmic crowning is used, a drop amount near the end surfaces of the rollers becomes larger than that of an arc crowning. Therefore, the force-fitting resistance given at the time of force-fitting the tapered rollers can be reduced.

Advantageous Effects of Invention

According to the embodiment of the present invention, the bearing can be assembled through force-fitting of the tapered rollers. Thus, there can be provided the tapered roller bearing which is capable of eliminating the need for the caulking step for the retainer at the time of assembling of the bearing and preventing contact failure between the retainer and the tapered rollers due to residual deformation.

BRIEF DESCRIPTION OF DRAWINGS

FIG. 19A is a sectional view for illustrating an assembling step for the tapered roller bearing according to the present invention.
FIG. 19B is a sectional view for illustrating the assembling step for the tapered roller bearing according to the present invention.
FIG. 20 is a table for showing a relationship between a value of H/t and a roller filling ratio.

DESCRIPTION OF EMBODIMENTS

Detailed description is made of a tapered roller bearing according to an embodiment of the present invention with reference to the drawings.

Figure 1:
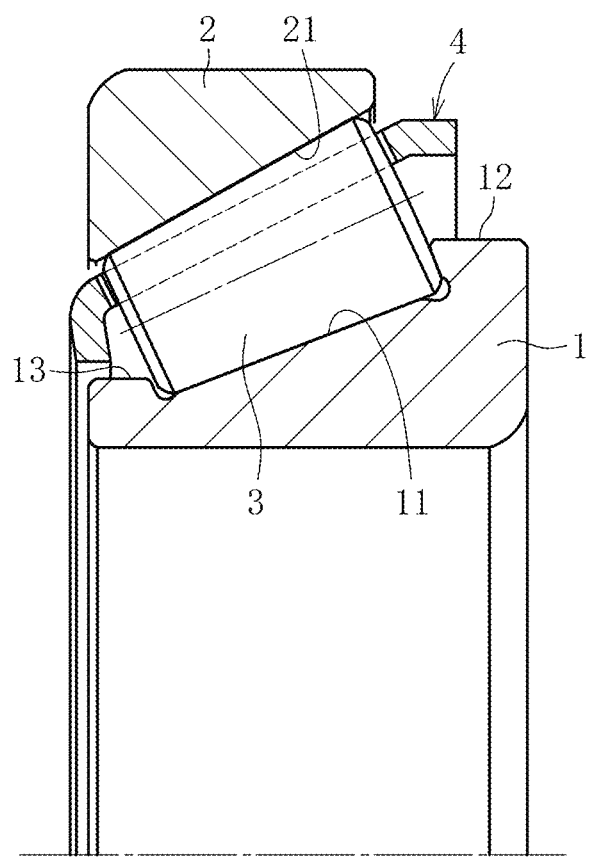
FIG. 1 is a sectional view of a tapered roller bearing.

FIG. 1 is a sectional view of the tapered roller bearing.
As illustrated in FIG. 1, the tapered roller bearing comprises an inner ring 1, an outer ring 2, a plurality of tapered rollers 3, and a retainer 4. The outer ring 2 is arranged on an outer peripheral side of the inner ring 1. The plurality of tapered rollers 3 are arranged between the inner ring 1 and the outer ring 2. The retainer 4 is formed of a steel plate, and is configured to retain the tapered rollers 3 at predetermined intervals in a circumferential direction. An inner raceway surface 11 having a tapered shape is formed on an outer peripheral surface of the inner ring 1. An outer raceway surface 21 having a tapered shape is formed on an inner peripheral surface of the outer ring 2. The tapered rollers 3 are rollably arranged between the inner raceway surface 11 and the outer raceway surface 21. A large-diameter-side flange portion 12 and a small-diameter-side flange portion 13, which project radially outward, are formed at a large-diameter end portion and a small-diameter end portion of the inner ring 1, respectively. The outer ring 2 has no flange portion. Moreover, in the tapered roller bearing according to this embodiment, seal members are not arranged on both sides of the bearing in the axial direction, and hence both sides of a bearing internal space in the axial direction are opened.

Figure 2:
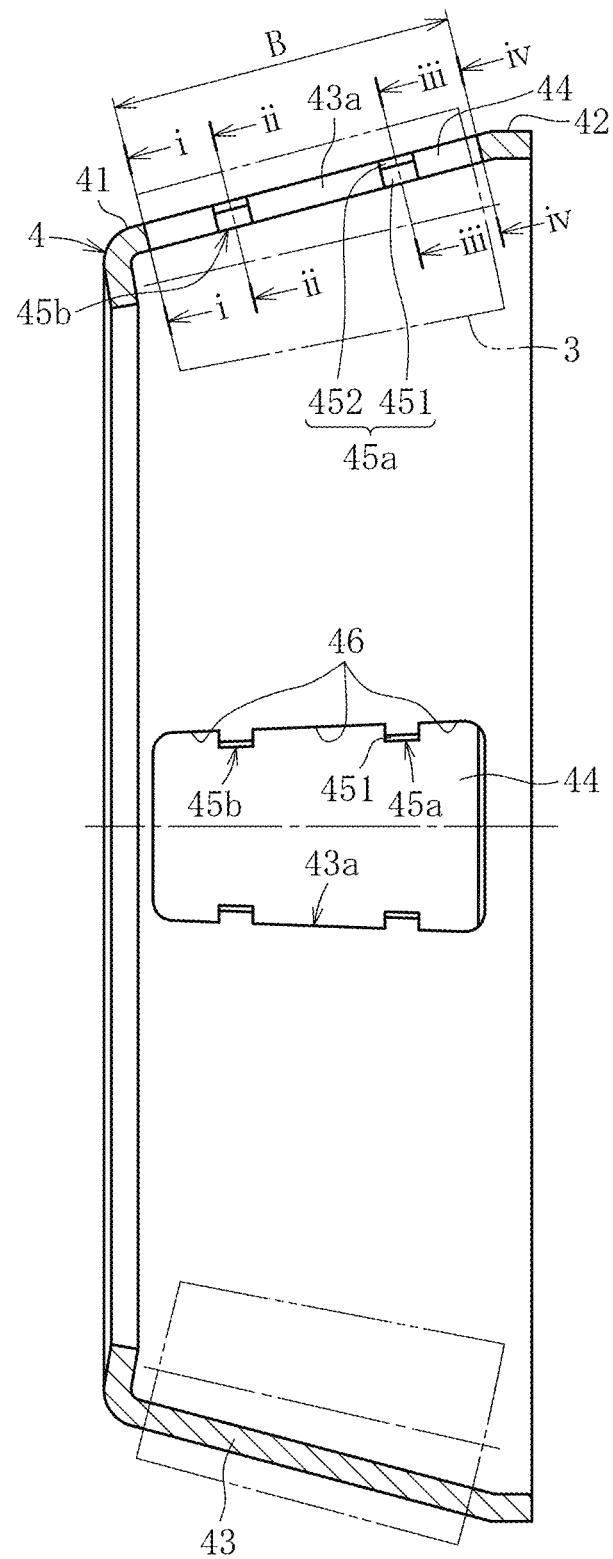
FIG. 2 is a sectional view of a retainer.

FIG. 2 is a sectional view of the retainer 4. FIG. 3A to FIG. 3D are sectional views taken along the line i-i, the line ii-ii, the line iii-iii, and the line iv-iv in FIG. 2, respectively.

As illustrated in FIG. 2, the retainer 4 integrally comprises a small-diameter-side annular portion 41, a large-diameter-side annular portion 42, and a plurality of pillar portions 43 connecting the small-diameter-side annular portion 41 and the large-diameter-side annular portion 42 to each other. The retainer 4 has pockets 44 each having a trapezoidal shape (see FIG. 11). The pockets 44 are each defined by the small-diameter-side annular portion 41, the large-diameter-side annular portion 42, and the pillar portions 43 adjacent to each other in the circumferential direction, and are configured to receive the tapered rollers 3.

Side surfaces 43a of the pillar portion 43 each have two projecting portions 45a and 45b projecting into the pocket 44. The projecting portions 45a and 45b are formed so as to be separated apart from the small-diameter-side annular portion 41 and the large-diameter-side annular portion 42 in an axial direction of the tapered roller 3 (hereinafter referred to as "roller axis direction"). Specifically, the projecting portion 45a on the large-diameter side is formed so as to be separated apart from the large-diameter-side annular portion 42 toward a retainer small-diameter side, and the projecting portion 45b on the small-diameter side is formed so as to be separated apart from the small-diameter-side annular portion 41 toward a retainer large-diameter side. That is, all of the projecting portions 45a and 45b are formed so as to be independently separated apart from the small-diameter-side annular portion 41 and the large-diameter-side annular portion 42. Moreover, the projecting portion 45a on the large-diameter side and the projecting portion 45b on the small-diameter side are formed so as to be separated apart from each other in the roller axis direction. Three or more projecting portions may be formed on each side surface 43a of the pillar portion.

Figure 3A:
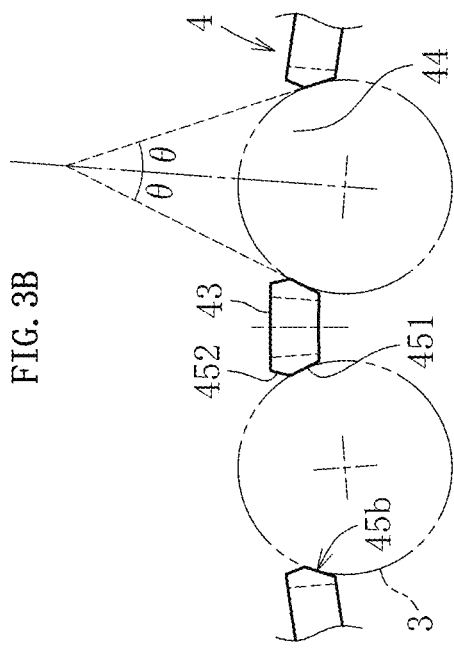
FIG. 3A is a sectional view taken along the line iii-iii in FIG. 2.
Figure 3C:
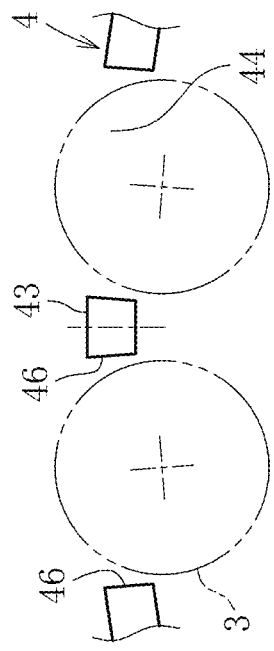
FIG. 3C is a sectional view taken along the line iv-iv in FIG. 2.
Figure 3B:
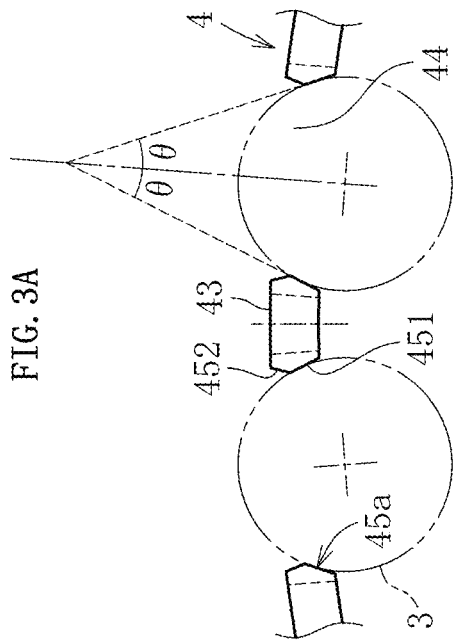
FIG. 3B is a sectional view taken along the line ii-ii in FIG. 2.
Figure 3D:
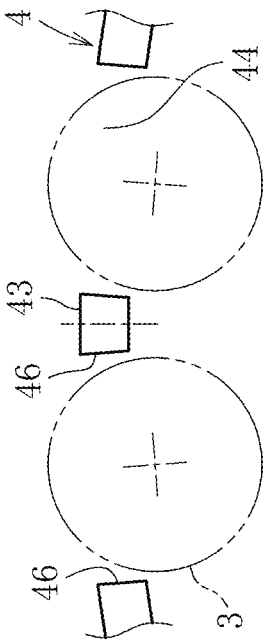
FIG. 3D is a sectional view taken along the line i-i in FIG. 2.

As illustrated in FIG. 3A and FIG. 3B, distal end surfaces of the projecting portions 45a and 45b each have a region 451 on a radially inner side and a region 452 on a radially outer side, and a boundary portion between the regions 451 and 452 is formed into a V-shape in cross section which projects most into the pocket 44. In the distal end surfaces of the projecting portions 45a and 45b, the region 451 on the radially inner side forms a tapered guide surface which is to be held in contact with a tapered outer peripheral surface of the tapered roller 3. In the side surface 43a of the pillar portion 43, as illustrated in FIG. 3C and FIG. 3D, a region 46 (see FIG. 2) excluding the projecting portions 45a and 45b is a non-contact portion which is not to be held in contact with the tapered outer peripheral surface of the tapered roller 3. The non-contact portion 46 has a straight surface which is parallel to a movement track given when the tapered roller 3 is moved in the radial direction of the bearing.

Figure 24:
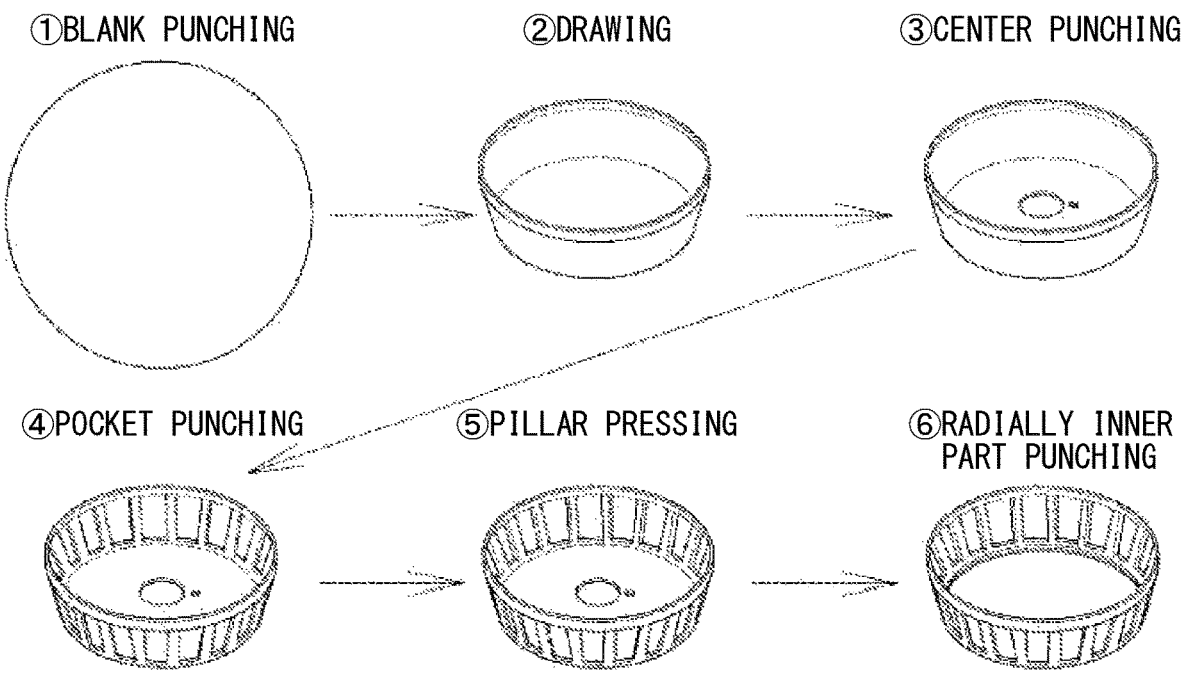
FIG. 24 is a perspective view for illustrating a manufacturing step for a retainer formed of a steel plate.
Figure 25A:
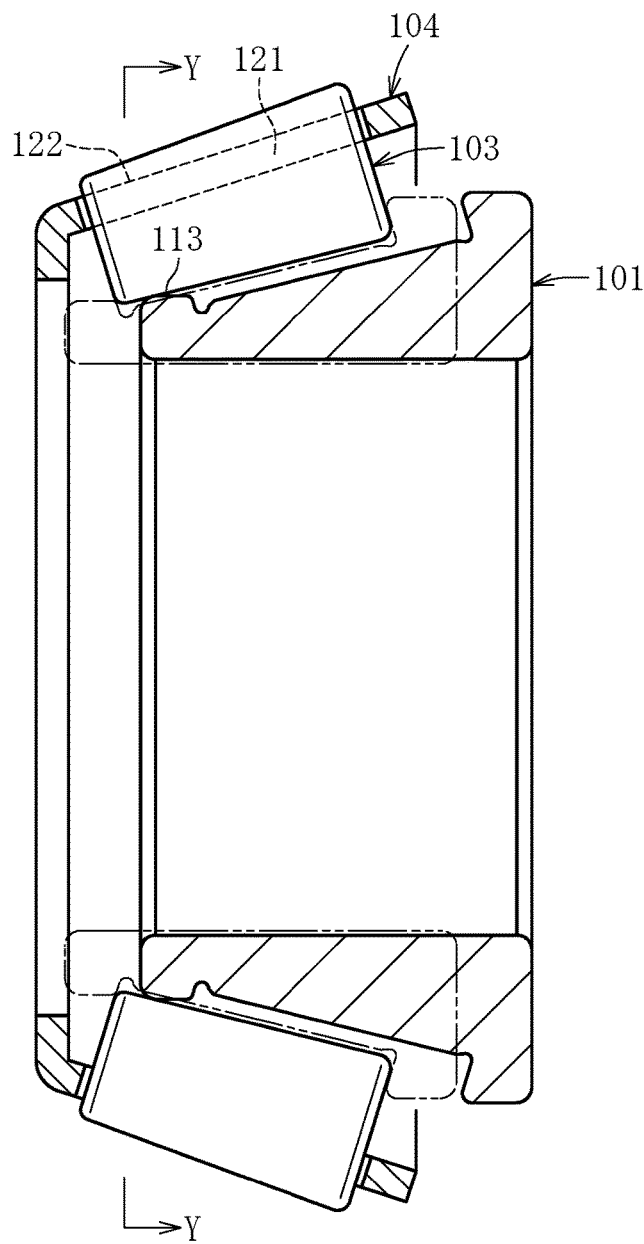
FIG. 25A is a sectional view for illustrating a related-art assembling step for a tapered roller bearing.
Figure 25B:
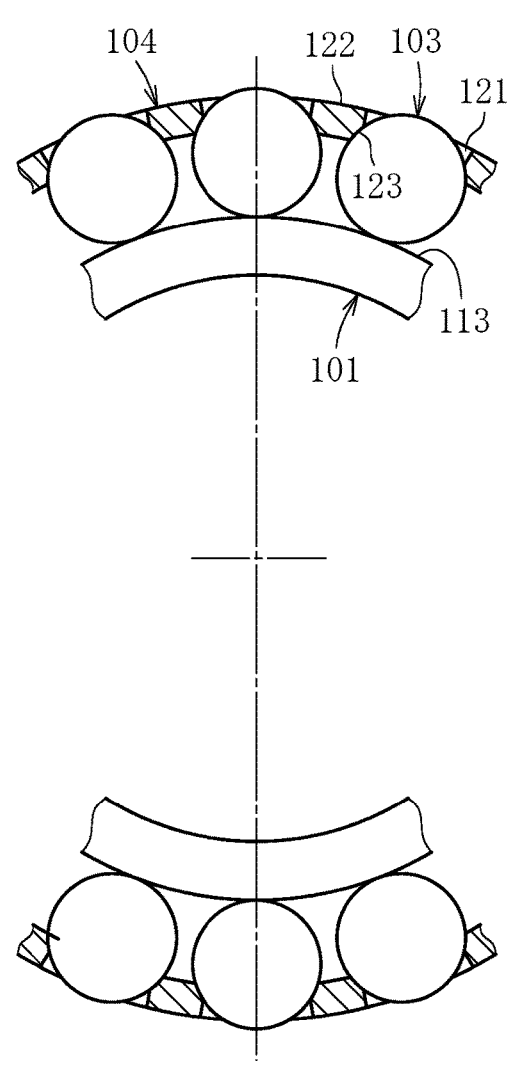
FIG. 25B is a sectional view taken along the line Y-Y in FIG. 25A.
Figure 26A:
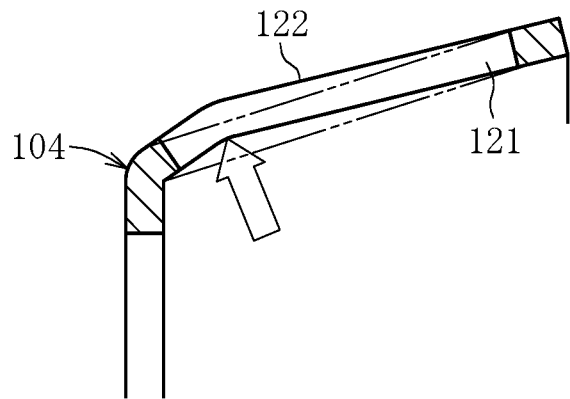
FIG. 26A is a sectional view for illustrating a related-art assembling step for a tapered roller bearing.
Figure 26B:
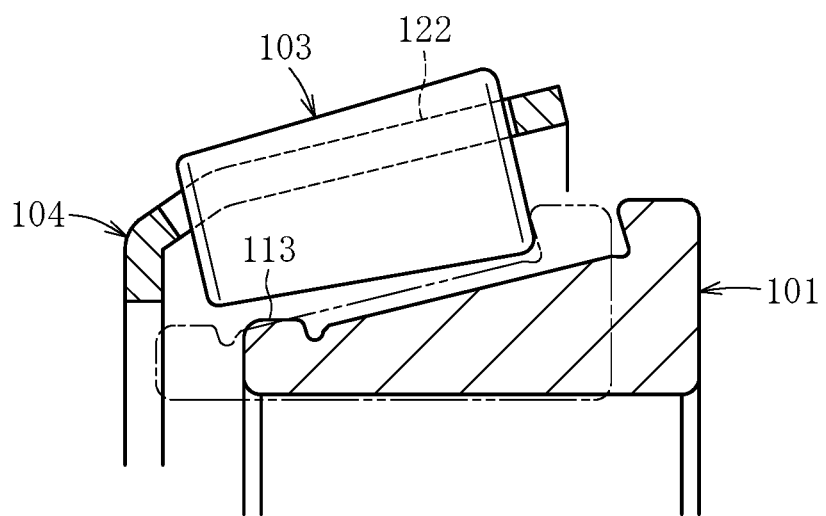
FIG. 26B is a sectional view for illustrating the related-art assembling step for the tapered roller bearing.
Figure 26C:
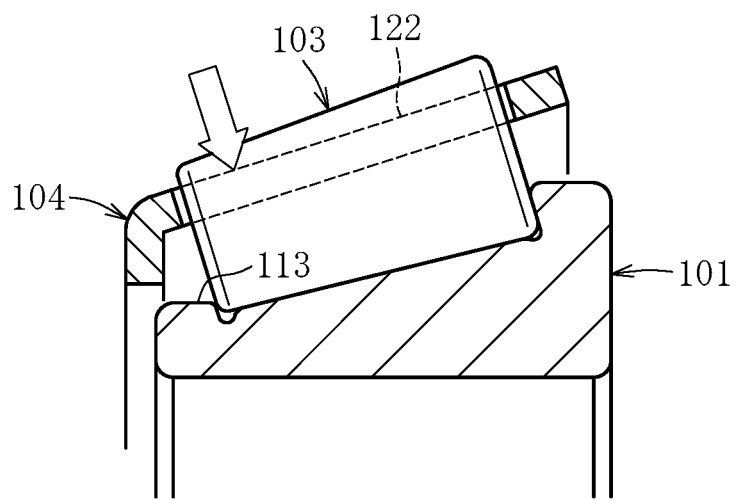
FIG. 26C is a sectional view for illustrating the related-art assembling step for the tapered roller bearing.
Figure 27:
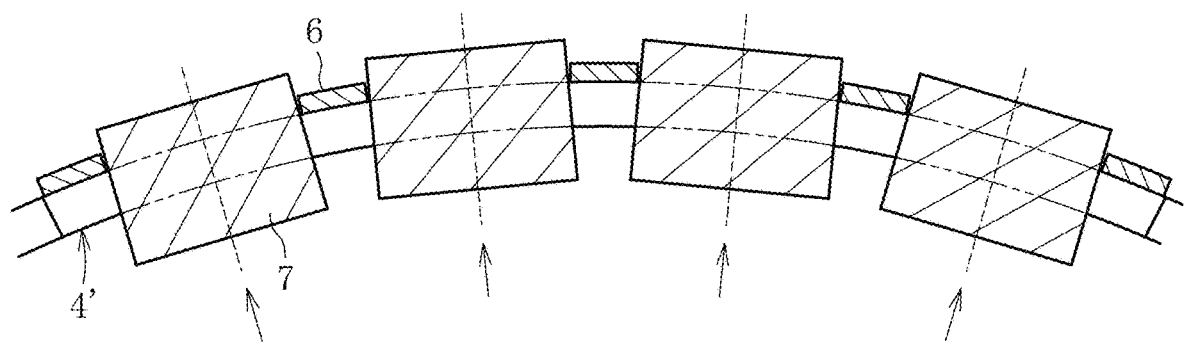
FIG. 27 is a sectional view for illustrating a pocket punching step for a retainer formed of a steel plate.

The retainer 4 is manufactured through the procedure similar to that of the related art, that is, through the procedure including, as illustrated in FIG. 24, (i) a blank punching step of punching out a circular blank from a steel plate, (ii) a drawing step of drawing the circular blank into a truncated con-like cup shape, (iii) a center punching step of punching a bottom of the cup to form a center guide hole and a rotation guide hole, (iv) a pocket punching step of punching a side surface of the cup to form the pockets 44 each having a trapezoidal shape, (v) a pillar pressing step of forming the tapered guide surfaces 451, which are to be held in contact with outer peripheral surfaces of the tapered rollers 3, on the side surfaces 43a of the pillar portions 43, and (vi) a radially inner part punching step of punching the bottom of the cup while leaving a rim unpunched. As the retainer 4, there may be used a retainer made of resin being a molded product of resin.

Figure 4:
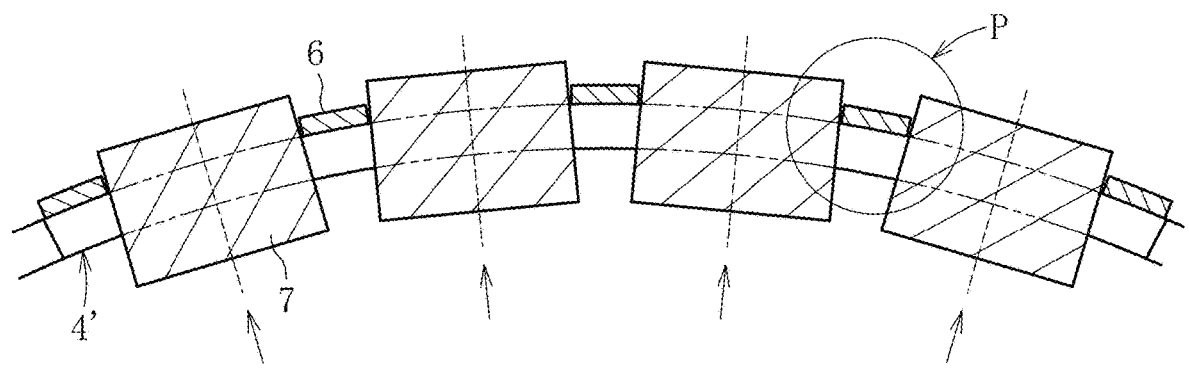
FIG. 4 is a sectional view for illustrating a pocket punching step.
Figure 5:
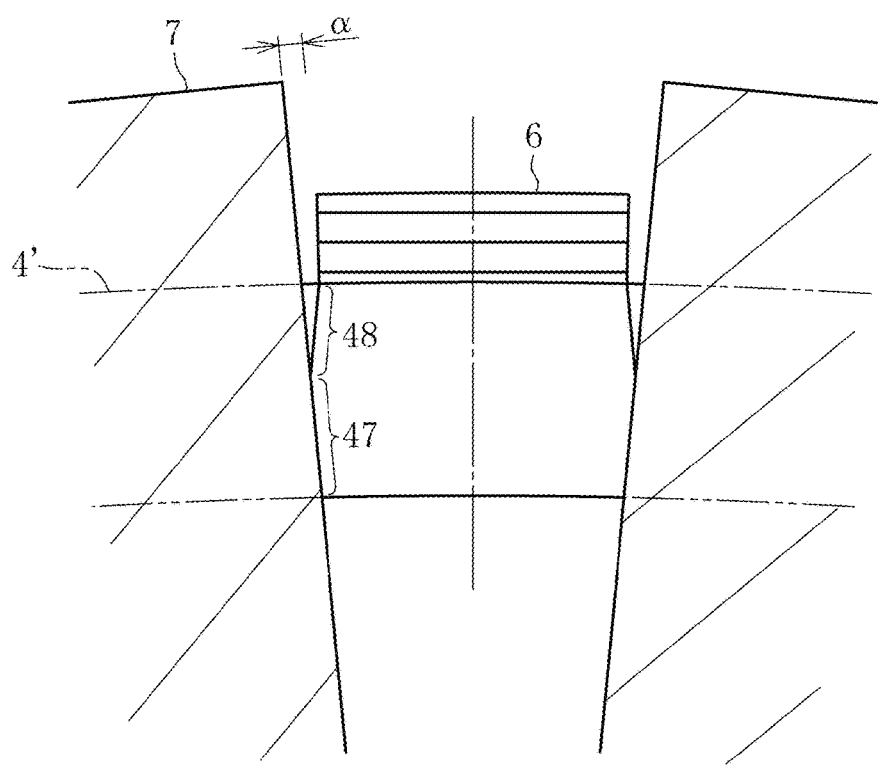
FIG. 5 is an enlarged sectional view for illustrating a region P in FIG. 4.

FIG. 4 is a sectional view for illustrating the pocket punching step of the steps described above. Moreover, FIG. 5 is an enlarged sectional view for illustrating the region P in FIG. 4.

As illustrated in FIG. 4, the pocket punching is performed in the following manner. Under a state in which a blank material 4' is arranged along an inner periphery of a die 6, punches 7 each having a shape corresponding to the shape of the pocket 44 illustrated in FIG. 2 are simultaneously moved from a radially inner side toward a radially outer side of the blank material 4', thereby punching some regions of the blank material 4' with the punches 7. As illustrated in FIG. 5, in a shear edge formed after punching, a burnished surface 47 is formed in a region on a radially inner side, and a fracture surface 48 is formed in a region on a radially outer side. The burnished surface 47 is a glossy smooth part having been burnished by a side surface of the punch 7. The fracture surface 48 is a part fractured by formation of a crack, and its surface has a fine roughness surface on which crystal grains appear. A radially outer end of the fracture surface 48 is located at a position retreated from the burnished surface 47 by the amount corresponding to a clearance a between the die 6 and the punch 7.

Figure 6A:
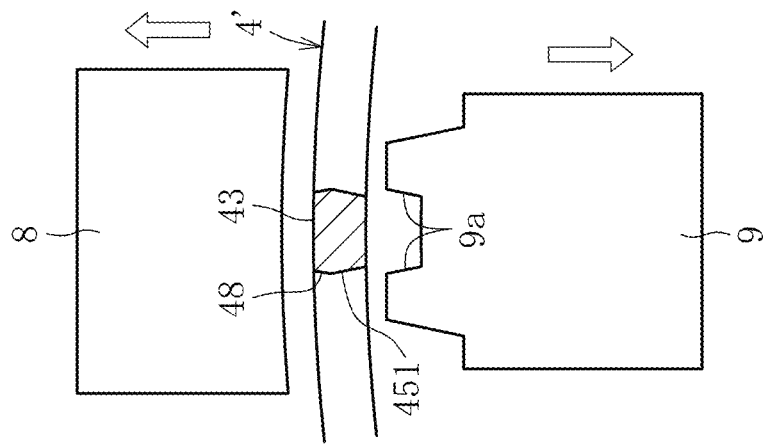
FIG. 6A is a sectional view for illustrating a pillar pressing step.
Figure 6B:
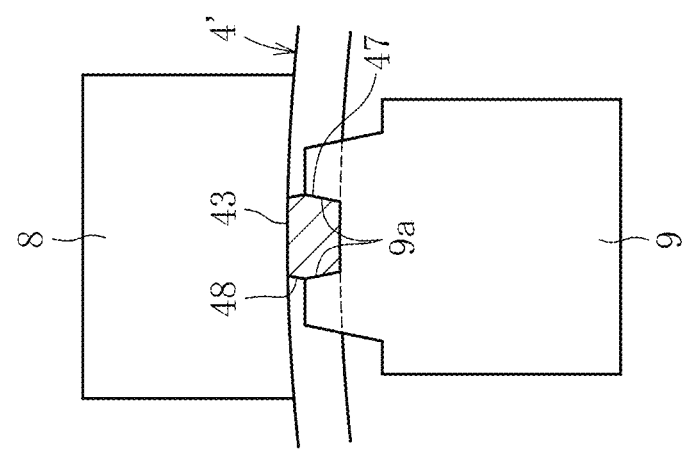
FIG. 6B is a sectional view for illustrating the pillar pressing step.
Figure 6C:
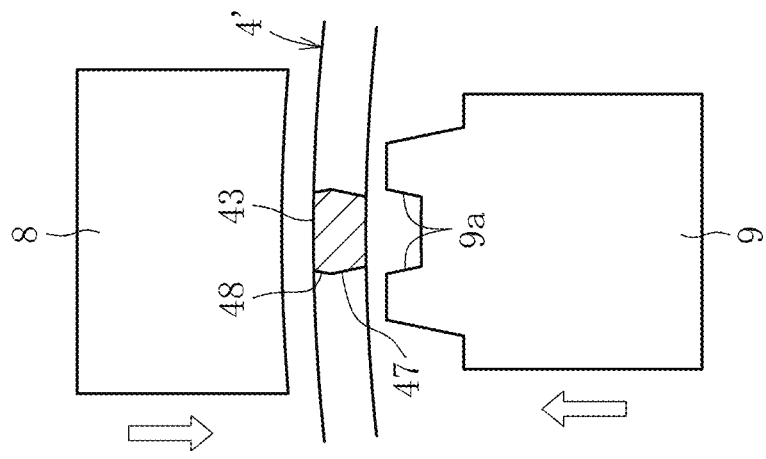
FIG. 6C is a sectional view for illustrating the pillar pressing step.

FIG. 6A to FIG. 6C are sectional views for illustrating the pillar pressing step of the steps described above.

As illustrated in FIG. 6A to FIG. 6C, the pillar pressing is a step of performing press forming of sandwiching the pillar portion 43 of the blank material 4' with a punch 8 and a die 9 to form the pillar portion 43 into a trapezoidal shape. Through the press forming, the shape of side walls 9a of a recessed portion of the die 9 is transferred to the burnished surfaces 47 of the pillar portion 43, thereby forming the guide surfaces 451 (a molded surface) each having a predetermined taper angle θ (see FIG. 3A and FIG. 3B). The fracture surface 48 and the non-contact portion 46 are not formed by the die 9 and remain unchanged.

After the pillar pressing step illustrated in FIG. 6A to FIG. 6C, the radially inner part punching step is performed, thereby completing the retainer 4 illustrated in FIG. 2. The completed retainer 4 is transferred to a bearing assembling step.

Figure 7A:
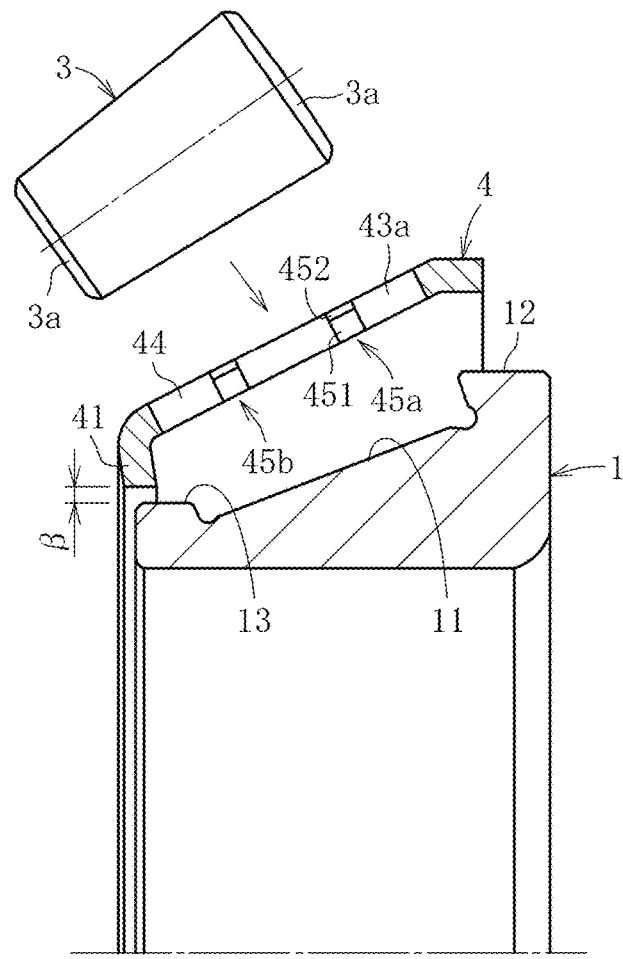
FIG. 7A is a sectional view for illustrating an assembling step for the tapered roller bearing according to the present invention.
Figure 7B:
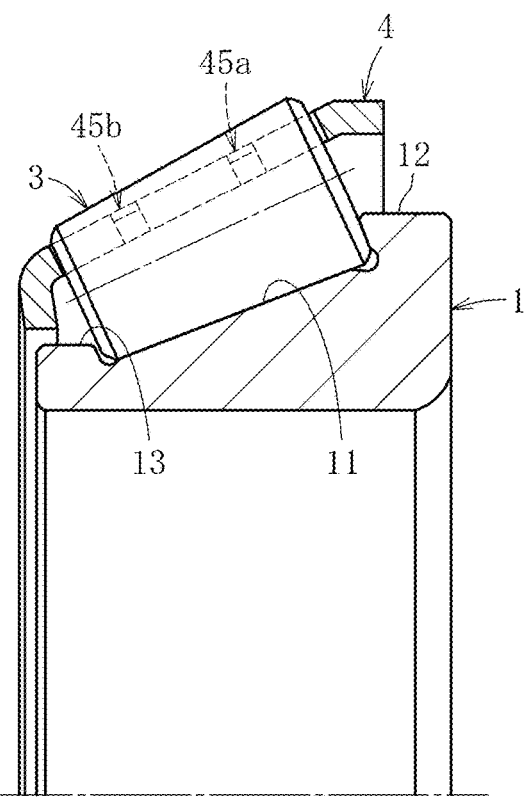
FIG. 7B is a sectional view for illustrating the assembling step for the tapered roller bearing according to the present invention.
Figure 8:
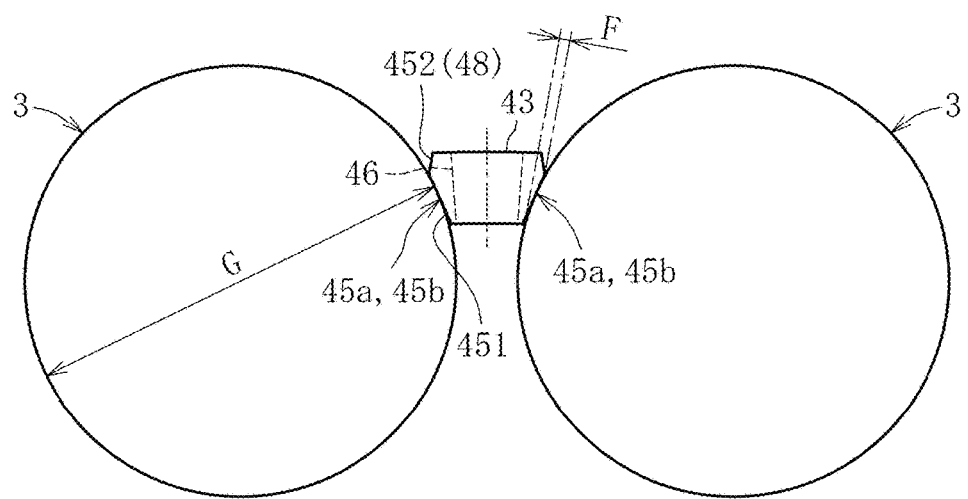
FIG. 8 is a sectional view for illustrating a state after force-fitting of the tapered rollers.

FIG. 7A and FIG. 7B are sectional views for illustrating an assembling step for the bearing, and FIG. 8 is a sectional view for illustrating a state after force-fitting of the tapered roller.

At the time of assembling of the tapered roller bearing, as illustrated in FIG. 7A, the retainer 4 is first arranged on an outer periphery of the inner ring 1. At this time, a minimum inner-diameter dimension of the small-diameter-side annular portion 41 of the retainer 4 is larger than an outer-diameter dimension of the small-diameter-side flange portion 13 of the inner ring 1, and a gap β is defined between the inner peripheral surface of the small-diameter-side annular portion 41 of the retainer 4 and the outer peripheral surface of the small-diameter-side flange portion 13. Thus, the retainer 4 can be arranged on the outer periphery of the inner ring 1 without any interference.

After that, as illustrated in FIG. 7B, the tapered roller 3 is received in the pocket 44 of the retainer 4. At that time, the tapered roller 3 inserted into the pocket 44 from the radially outer side of the retainer 4 is pressed against the projecting portions 45a and 45b, and the projecting portions 45a and 45b and the pillar portion 43 are elastically deformed to increase a distance in the circumferential direction between the projecting portions 45a, 45b which are adjacent to each other in the circumferential direction. After the tapered roller 3 passes through a space defined between the projecting portions 45a, 45b opposed to each other in the circumferential direction, the projecting portions 45a and 45b and the pillar portion 43 are elastically restored to an original shape (the series of operations described above is referred to as "force-fitting"). When the tapered roller 3 is arranged on the inner raceway surface 11, the guide surfaces 451 of the projecting portions 45a and 45b are held in contact with the outer peripheral surface of the tapered roller 3, thereby suppressing removal of the tapered roller 3 in the radially outward direction.

In order to allow the force-fitting of the tapered roller 3, as illustrated in FIG. 8, the projecting portions 45a and 45b each have a force-fit margin F. The force-fit margin F corresponds to a maximum displacement amount of each of the guide surfaces 451 of the projecting portions 45a and 45b at the time of force-fitting the tapered roller 3 into the pocket 44, with the state in which the tapered roller 3 is received in the pocket 44 as a reference. At least the projecting portions 45a and 45b and the pillar portion are designed so that elastic deformation by the amount corresponding to the force-fit margin F occurs in both at the time of force-fitting. In a case of a tapered roller bearing for an automobile such as a tapered roller bearing to be used for a differential gear device or a transmission device, the force-fit margin F of each of the projecting portions 45a and 45b has a suitable range of equal to or larger than 0.05 mm and equal to or smaller than 0.30 mm.

In order to allow the elastic deformation of the projecting portions 45a and 45b and the pillar portion 43 at the time of force-fitting, it is preferred that the force-fitting of the tapered roller 3 be performed only at one location in the circumferential direction each time. That is, after the force-fitting of one tapered roller 3 is completed, the retainer 4 is rotated by the amount corresponding to one pitch, and then force-fitting of the tapered roller 3 at another stage be performed at the same location. Subsequently, this operation is repeated to sequentially force-fit all of the tapered rollers 3 into the pockets 44 of the retainer 4. At this time, a plurality of tapered rollers 3 which are sufficiently separated apart from one another in the circumferential direction may be simultaneously force-fitted into the retainer 4. As a matter of course, when there arises no particular problem, all of the tapered rollers 3 can be simultaneously force-fitted to the pockets of the retainer 4.

After all of the tapered rollers 3 are retained by the retainer 4 through force-fitting of the tapered rollers 3, the assembly illustrated in FIG. 7B comprising the inner ring 1, the tapered rollers 3, and the retainer 4 is completed. After that, the outer ring 2 is arranged on the radially outer side of the assembly, thereby completing the tapered roller bearing illustrated in FIG. 1.

As described above, the tapered roller bearing according to the embodiment of the present invention has a unique feature in that, at the time of assembling of the tapered roller bearing, the tapered rollers 3 can be force-fitted to the pockets 44 of the retainer 4. In relation to such feature, according to the embodiment of the present invention, the projecting portions 45a and 45b are separated apart from the small-diameter-side annular portion 41 and the large-diameter-side annular portion 42 of the retainer 4 in the roller axis direction, and the projecting portion 45a on the large-diameter side and the projecting portion 45b on the small-diameter side are separated apart from each other in the roller axis direction. Thus, an area of each of the guide surfaces 451 of the projecting portions 45a and 45b is small. Therefore, even when the retainer 4 is manufactured with the steel plate, the projecting portions 45a and 45b and the pillar portion 43 can easily be elastically deformed, and hence the force-fitting of the tapered rollers 3 can be performed smoothly. Moreover, the projecting portions 45a and 45b are arranged on both sides across an intermediate point of the tapered roller 3 in the roller axis direction. Therefore, a posture of the tapered roller 3 to be guided by the guide surfaces 451 can be stabilized.

As described above, the force-fitting of the tapered rollers 3 to the retainer pockets 44 can be performed. Thus, at the time of assembling of the bearing, as illustrated in FIG. 7A and FIG. 7B, there may be employed an assembling procedure such as force-fitting of the tapered rollers 3 from the radially outer side of the retainer 4 under the state in which the retainer 4 is arranged on the outer peripheral side of the inner ring 1. Thus, there is no need to caulk the retainer 4 at the time of assembling of the bearing. Therefore, a contact failure between the tapered roller 3 and the inner surface of the pocket 44 due to the residual deformation given at the time of caulking can be prevented, thereby being capable of stabilizing the bearing performance.

Moreover, according to the embodiment of the present invention, the fracture surface 48 remains unchanged in the region 452 on the radially outer side of each of the distal end surfaces of the projecting portions 45a and 45b. This fracture surface 48 depends on the clearance a (see FIG. 5) between the die 6 and the punch 7 used in the pocket punching step, and as illustrated in FIG. 8, is formed in a slightly inclined state so that a distance between the fracture surfaces 48 of the projecting portions 45a, 45b opposed to each other in the circumferential direction is larger on the radially outer side than on the radially inner side. With the presence of this inclination, the fracture surface 48 functions as a guide portion configured to guide the tapered roller 3 in the force-fitting direction, thereby attaining the effect of reducing the force-fitting resistance.

In order to suppress generation of an edge load, the outer peripheral surface of the tapered roller 3 generally has a crowning within a range of an effective length of the tapered roller 3 (range of a length excluding a chamfer 3a of the tapered roller 3). In the related art, as the crowning, there is often used an arc crowning in which the generating line shape is formed into a single arc having a constant curvature radius. In contrast, in recent years, in order to further suppress generation of the edge load, as the crowning of the tapered roller 3, there is increase in use of a logarithmic crowning in which the generating line shape is formed into a logarithmic curve.

Figure 9:
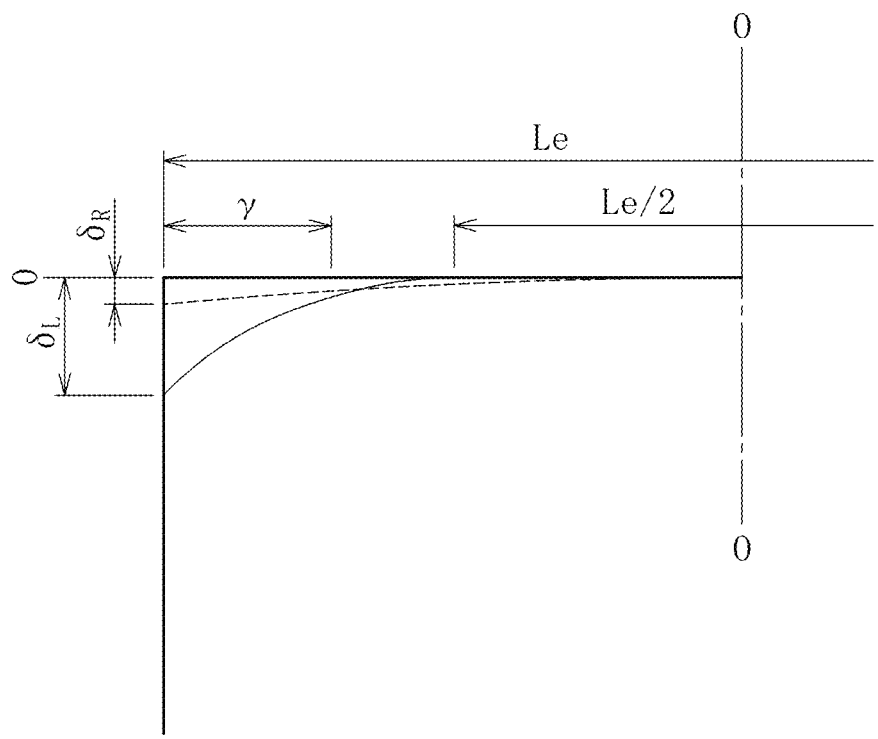
FIG. 9 is an illustration of a generating line shape of an arc crowning and a generating line shape of a logarithmic crowning for comparison.

In FIG. 9, illustration is given of a generating line shape of the arc crowning (broken line) and a generating line shape of the logarithmic crowning (solid line) for comparison. As illustrated in FIG. 9, in the logarithmic crowning, the generating line shape has a straight line (drop amount of 0) within a range of Le/2 with a center at an axial intermediate point 0 of an effective length Le of the roller 3. The generating line shape out of the range of Le/2 has a logarithmic curve with the drop amount of 0 at the coordinate Le/2, and a drop amount $\delta_L$ thereof is larger on an end surface side of the tapered roller 3.

As illustrated in FIG. 9, in the logarithmic crowning, the drop amount $\delta_L$ of the tapered roller 3 on the end surface side is larger than a drop amount $\delta_R$ of the tapered roller 3 having the same size which is formed with the arc crowning. Thus, when the tapered roller 3 having the logarithmic crowning is used, as compared to the tapered roller 3 in the related art having the arc crowning, the force-fitting of the tapered roller 3 to the retainer 4 can be performed more easily. In order to attain such effect, it is preferred that the projecting portions 45a and 45b be formed within a region γ in FIG. 9 in which the drop amount $δ_L$ of the logarithmic crowning is larger than the drop amount $δ_R$ of the arc crowning.

Figure 10:
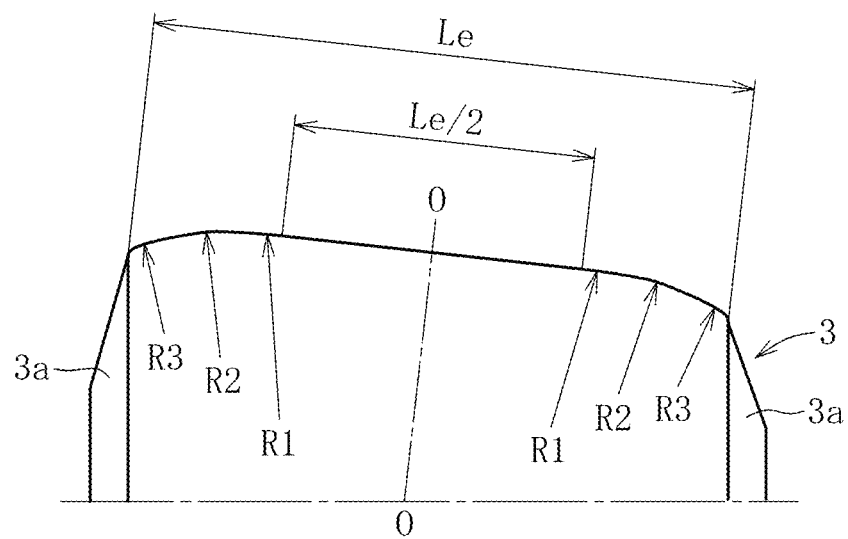
FIG. 10 is a side view for illustrating the tapered roller.

There is difficulty in matching the generating line shape of the tapered roller 3 with a theoretical logarithmic curve. Therefore, in the actual tapered roller 3, the crowning is not formed with the theoretical logarithmic curve but formed with an approximation curve of the theoretical logarithmic curve (which is referred to as "logarithmic crowning" also in this case). For example, as illustrated in FIG. 10, when a plurality of (three in FIG. 10) arcs having different curvature radii R are connected, and the curvature radius R of the arc is set smaller on the roller end portion side (R1>R2>R3), the crowning having a shape approximate to the logarithmic curve can be obtained. At this time, the arcs R1, R2, and R3 may be connected with a smooth arc.

Figure 11:
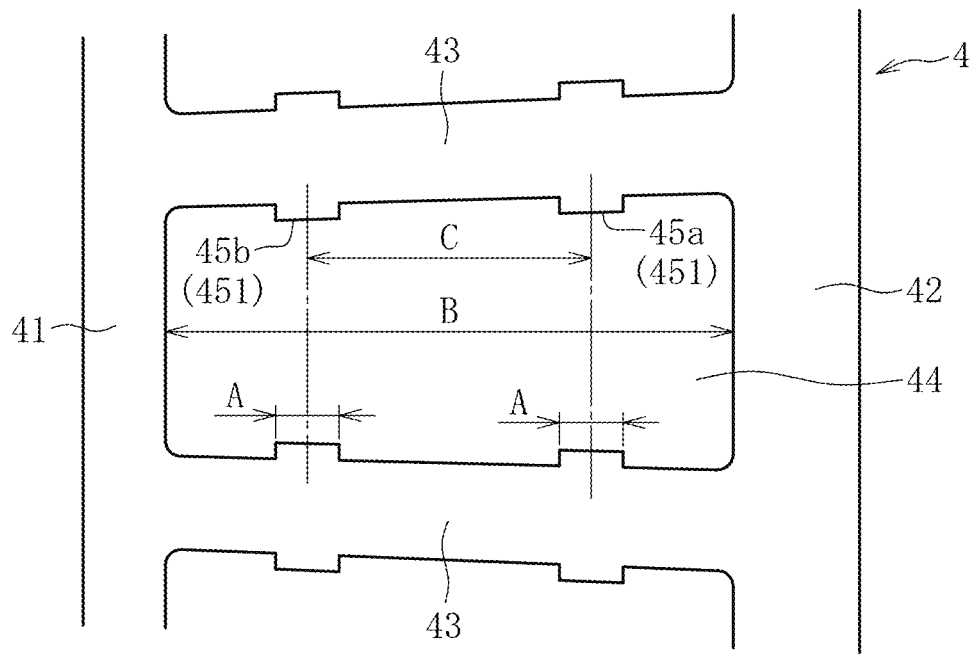
FIG. 11 is an enlarged plan view of the retainer as seen from a radially outer side.
Figure 12:
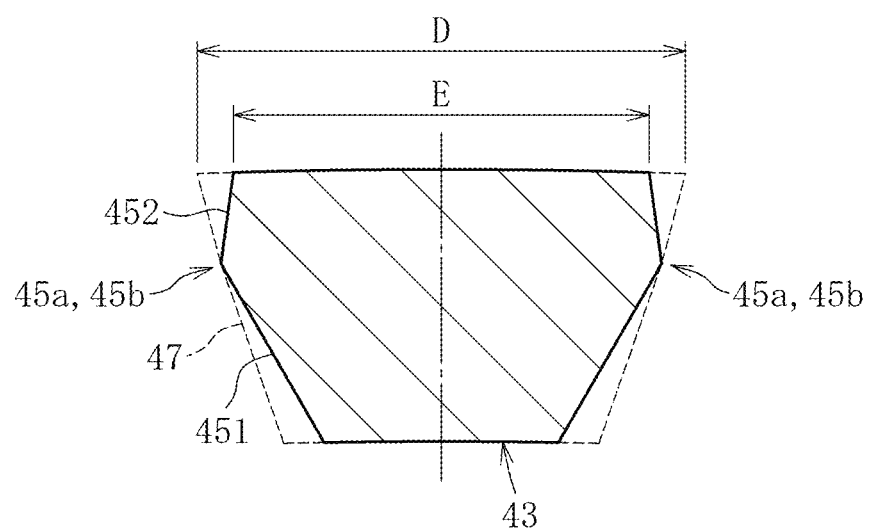
FIG. 12 is a sectional view of a pillar portion.

Now, with reference to FIG. 11 and FIG. 12, description is made of dimensions of components of the retainer which are favorable for attaining the effect described above. FIG. 11 is an enlarged plan view of the retainer 4 as seen from the radially outer side. FIG. 12 is a sectional view of the pillar portion 43.

(1) Relationship between Width A of Guide Surface and Pocket Entire Width B

As illustrated in FIG. 11, under a condition in which a width in the roller axis direction of the guide surface 451 configured to guide the tapered roller 3 (width in the roller axis direction is hereinafter simply referred to as "width") is represented by A, and an entire width of the pocket is represented by B, evaluation was made on the force-fitting performance of the tapered roller 3 given when a ratio B/A was changed. Through the evaluation, the results shown in Table 1 were obtained.

TABLE 1

|     | 2 | 3 | 4.5 | 10 | 15 | 20 | 21 | 22 |
|-----|---|---|-----|----|----|----|----|----|
| B/A | x | Δ | ○   | ○  | ○  | ○  | Δ  | x  |

As shown in Table 1, when the ratio B/A was 2, the force-fitting width was excessively large. As a result, damage occurred in the outer peripheral surface of the tapered roller 3 (roller damage), or torsion occurred in the pillar portion 43 after force-fitting (10 out of 10). When the ratio B/A was 3, some improvement could be observed, but similar problems occurred (4 out of 10). Thus, it was considered that the force-fitting width was still excessively large. Meanwhile, when the ratio B/A was 22, the force-fitting width was excessively small. As a result, the roller removal occurred, or the roller damage occurred during the operation of the bearing (10 out of 10). When the ratio B/A was 21, some improvement could be observed, but similar problems occurred (5 out of 10). Thus, it was considered that the force-fitting width was still excessively small.

Meanwhile, when the ratio B/A was within the range of from 4.5 to 20, such problems did not occur. Thus, it is preferred that the ratio B/A of the pocket entire width B to the width A of the guide surface be set within the range of B/A=4.5 to 20.

(2) Relationship between Width C of Center Portions of Guide Surfaces and Pocket Entire Width B As illustrated in FIG. 11, under a condition in which a width of center portions in the roller axis direction of the guide surfaces 451 of the projecting portions 45a and 45b is represented by C, and the entire width of the pocket 44 is represented by B, evaluation was made on a degree of occurrence of the roller damage or the roller removal given when a ratio C/B was changed. Through the evaluation, the results shown in Table 2 were obtained.

TABLE 2

|     | 0.3 | 0.4 | 0.45 | 0.5 | 0.55 | 0.6 | 0.7 |
|-----|-----|-----|------|-----|------|-----|-----|
| C/B | x   | Δ   | ○    | ○   | ○    | Δ   | x   |

As shown in Table 2, when the ratio C/B was 0.3, the guide surfaces 451 were intensively arranged near the center in the width direction, and limitation on inclination of the roller during the operation of the bearing became smaller. As a result, the roller damage occurred (8 out of 10). When the ratio C/B was 0.4, some improvement could be observed, but a similar problem occurred (3 out of 10). Meanwhile, when the ratio C/B was 0.7, in particular, a roller having a large crowning drop amount $δ_L$ was incorporated, the roller removal occurred (8 out of 10). When the ratio C/B was 0.6, some improvement could be observed, but the problem of the roller removal similarly occurred (2 out of 10).

Meanwhile, when the ratio C/B was within the range of from 0.45 to 0.55, such problem did not occur. Thus, it is preferred that the ratio C/B of the width C of the center portions of the guide surfaces to the pocket entire width B be set within the range of C/B=0.45 to 0.55.

(3) Relationship between Outermost Diameter Imaginary Length D of Pillar Portion and Outermost Diameter Actual Length E of Pillar Portion As already mentioned, the fracture surface 48 of each of the projecting portions 45a and 45b functions as a guide at the time of force-fitting the tapered roller 3 to the retainer 4. Thus, when a fracture thickness given at the time of forming the fracture surface 48 is small, there is a risk in that the fracture portion 452 does not function as the guide and generates the force-fitting resistance. In order to make evaluation on this issue, as illustrated in FIG. 12, under a condition in which an outermost diameter imaginary length of the pillar portion 43, that is, a length between intersecting points each formed between a line extended radially outward from the burnished surface 47 formed in the pocket punching step and a line extended in the circumferential direction from the outer peripheral surface of the pillar portion 43 is represented by D, and an outermost diameter actual length of the pillar portion, that is, an actual length in the circumferential direction of the radially outermost portion of the pillar portion 43 is represented by E, evaluation was made on the force-fitting resistance and the strength of the pillar portion 43 given when a ratio E/D was changed. Through the evaluation, the results shown in Table 3 were obtained.

TABLE 3

|     | 0.5 | 0.6 | 0.7 | 0.8 | 0.9 | 0.95 | 1 |
|-----|-----|-----|-----|-----|-----|------|---|
| E/D | x   | Δ   | ○   | ○   | ○   | ○    | Δ |

As shown in Table 3, when the ratio E/D was 0.5, the length in the circumferential direction of the pillar portion 43 became excessively smaller (pillar portion 43 became excessively thinner). As a result, the retainer 4 was broken during the operation of the bearing (9 out of 10). When the ratio E/D was 0.6, some improvement could be observed, but a similar problem occurred (4 out of 10). Meanwhile, when the ratio E/D was 1, the force-fitting resistance became larger. As a result, the roller damage occurred (2 out of 10).

Meanwhile, when the ratio E/D was within the range of from 0.7 to 0.95, such problem did not occur. Thus, it is preferred that the ratio E/D of the outermost diameter actual length E of the pillar portion 43 to the outermost diameter imaginary length D of the pillar portion 43 be set within the range of E/D=0.7 to 0.95.

(4) Relationship between Roller Diameter G and Force-fit Margin F

When the force-fit margin F illustrated in FIG. 8 is excessively large, the frequency of occurrence of the roller damage increases. When the force-fit margin F is excessively small, there arises a problem of the roller removal. In order to make evaluation on this issue, under a condition in which the roller diameter is represented by G, and the force-fit margin is represented by F, evaluation was made on degrees of the force-fitting resistance and the roller removal given when a ratio G/F was changed. Through the evaluation, the results shown in Table 4 were obtained.

TABLE 4

|     | 10 | 20 | 30 | 40 | 50 | 60 | 70 | 80 |
|-----|----|----|----|----|----|----|----|----|
| G/F | x  | Δ  | ∘  | ∘  | ∘  | Δ  | x  | x  |

As shown in Table 4, when the ratio G/F was 10, the force-fit margin with respect to the roller diameter became relatively larger. As a result, the roller damage occurred (8 out of 10). When the ratio G/F was 20, some improvement could be observed, but a similar problem occurred (4 out of 10). Meanwhile, when the ratio G/F was 80, the force-fit margin with respect to the roller diameter became relatively smaller. As a result, the roller removal occurred (10 out of 10). When the ratio G/F was 70 and 60, some improvement could be observed, but a similar problem occurred (8 out of 10, and 3 out of 10).

Figure 13:
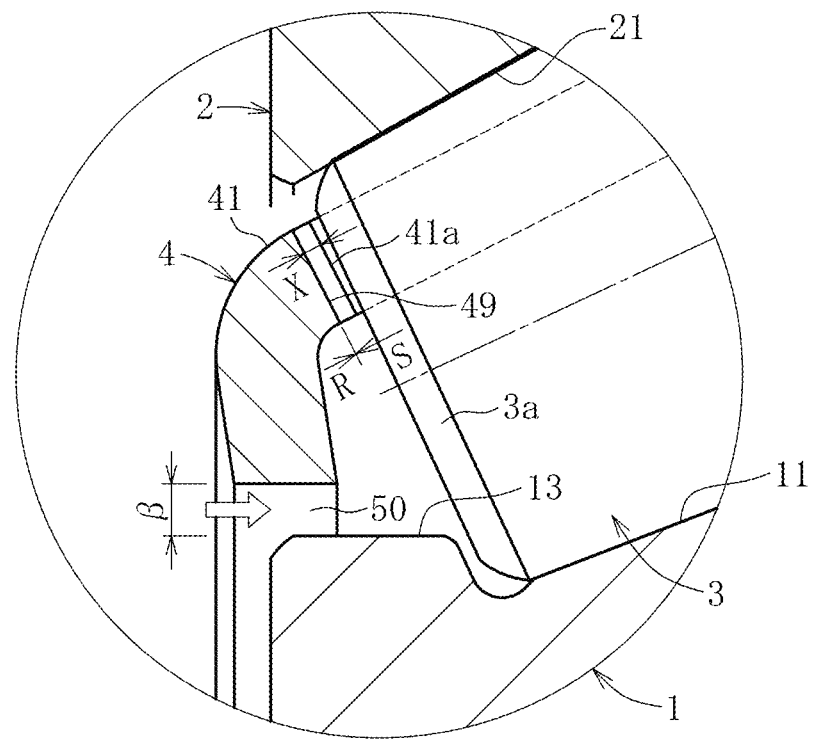
FIG. 13 is an enlarged sectional view of the tapered roller bearing on a small-diameter end side of the retainer.
Figure 14:
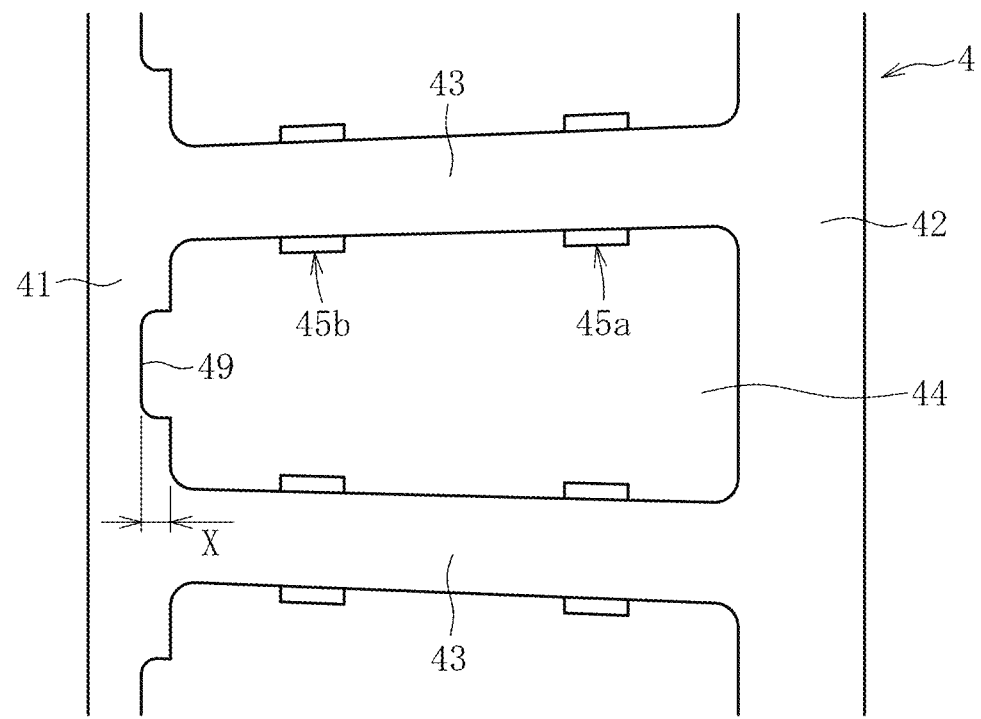
FIG. 14 is an enlarged plan view of the retainer as seen from the radially outer side.

In each of the embodiments described above, when a measure to reduce torque described below is performed, the reduction in torque of the tapered roller bearing can be achieved. Now, with reference to FIG. 13 and FIG. 14, description is made of the measure to reduce the torque. FIG. 13 is an enlarged sectional view of the tapered roller bearing including the small-diameter end side of the retainer 4. FIG. 14 is an enlarged plan view of the retainer 4 as seen from a radially outer side.

For devices such as a differential gear device or a transmission device of an automobile, oil bath lubrication is performed. Thus, during drive of those devices, lubricating oil flows into the bearing from the small-diameter side of the tapered roller bearing, thereby lubricating the inner raceway surface 11 or the outer raceway surface 21. At this time, as illustrated in FIG. 13, lubricating oil (indicated by the outlined arrow) having flowed into the bearing through a gap 50 defined between the inner peripheral surface of the small-diameter-side annular portion 41 of the retainer 4 and the outer peripheral surface of the small-diameter-side flange portion 13 of the inner ring 1 flows along the inner raceway surface 11. However, the large-diameter-side flange portion 12 (see FIG. 1) is present on the downstream side in the flow direction. Therefore, the flow of the lubricating oil is interrupted, and the lubricating oil becomes more liable to stagnate inside the bearing. As a result, a torque loss increases.

As a countermeasure therefor, as illustrated in FIG. 14, a cutout 49 is formed in an inner surface of the pocket of the small-diameter-side annular portion 41 of the retainer 4. With this, part of the lubricating oil having flowed into the bearing through the gap 50 is moved by a centrifugal force toward the outer ring 2 side through the cutout 49 and flows along the outer raceway surface 21. The outer ring 2 has no flange portion configured to interrupt the flow of the lubricating oil, and hence the lubricating oil can smoothly flow along the outer raceway surface 21. Thus, the torque loss due to the flow resistance of the lubricating oil can be reduced by reducing the amount of lubricating oil flowing along the inner raceway surface 11 to reduce the amount of lubricating oil stagnating inside the bearing.

In order to attain the effect described above, it is preferred that a depth X of the cutout 49 be set so as to be equal to or larger than 0.1 mm to allow a sufficient amount of lubricating oil to flow into the outer ring 2 side. Moreover, it is preferred that a width β, of the gap 50 defined between the inner peripheral surface of the small-diameter-side annular portion 41 of the retainer 4 and the outer peripheral surface of the small-diameter-side flange portion 13 of the inner ring 1 be set to 2.0% or less of the outer-diameter dimension of the small-diameter-side flange portion 13 of the inner ring 1.

It is preferred that the depth X of the cutout 49 be limited to the depth to a starting point of the curved round portion R on the radially inner side of the small-diameter-side annular portion 41. With this, the cutout 49 is formed at a portion corresponding to the straight portion S of the small-diameter-side annular portion 41, thereby being capable of forming the cutout 49 in the pocket punching step (see FIG. 4).

Figure 15:
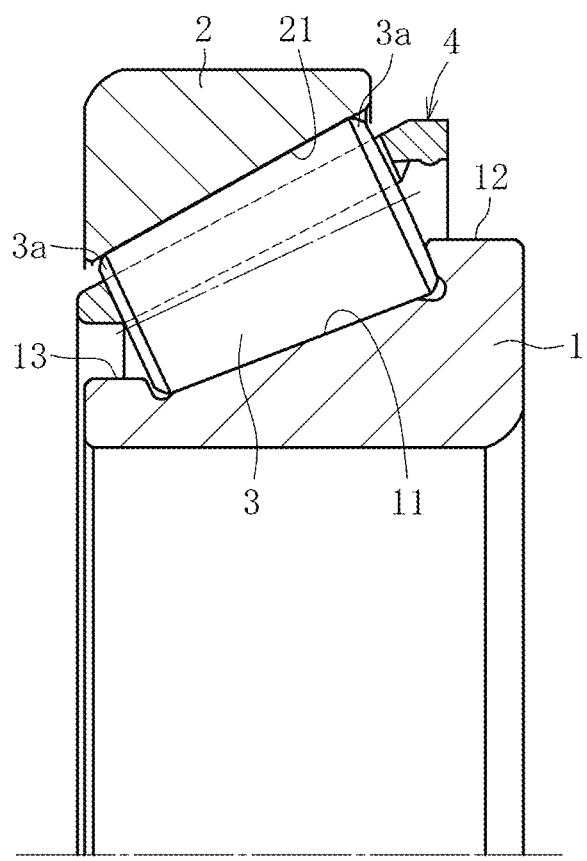
FIG. 15 is a sectional view of a tapered roller bearing comprising a retainer made of resin.

Next, description is made of a tapered roller bearing according to another embodiment of the present invention comprising a retainer made of resin. FIG. 15 is a sectional view for illustrating the tapered roller bearing according to this embodiment.

As illustrated in FIG. 15, the tapered roller bearing comprises an inner ring 1, an outer ring 2, a plurality of tapered rollers 3, and a retainer 4. The outer ring 2 is arranged on an outer peripheral side of the inner ring 1. The plurality of tapered rollers 3 are arranged between the inner ring 1 and the outer ring 2. The retainer 4 is made of resin, and is configured to retain the tapered rollers 3 at predetermined intervals in a circumferential direction. An inner raceway surface 11 having a tapered shape is formed on an outer peripheral surface of the inner ring 1. An outer raceway surface 21 having a tapered shape is formed on an inner peripheral surface of the outer ring 2. The tapered rollers 3 are rollably arranged between the inner raceway surface 11 and the outer raceway surface 21. A large-diameter-side flange portion 12 and a small-diameter-side flange portion 13, which project radially outward, are formed at a large-diameter end portion and a small-diameter end portion of the inner ring 1, respectively. The outer ring 2 has no flange portion. Moreover, in the tapered roller bearing according to this embodiment, seal members are not arranged on both sides of the bearing in the axial direction. Therefore, both sides of the bearing internal space in the axial direction are opened. However, the both sides of the bearing in the axial direction may be sealed with the seal members as needed.

Figure 16:
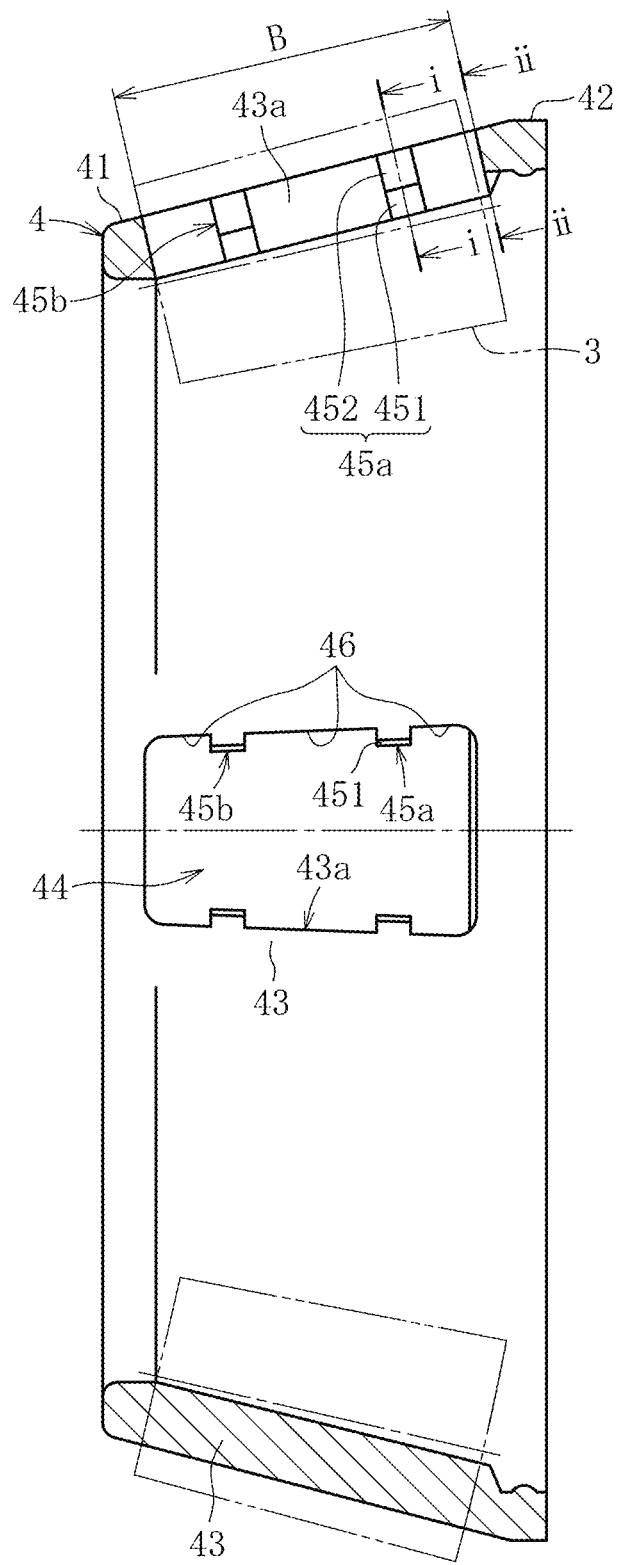
FIG. 16 is a sectional view of the retainer made of resin.
Figure 17:
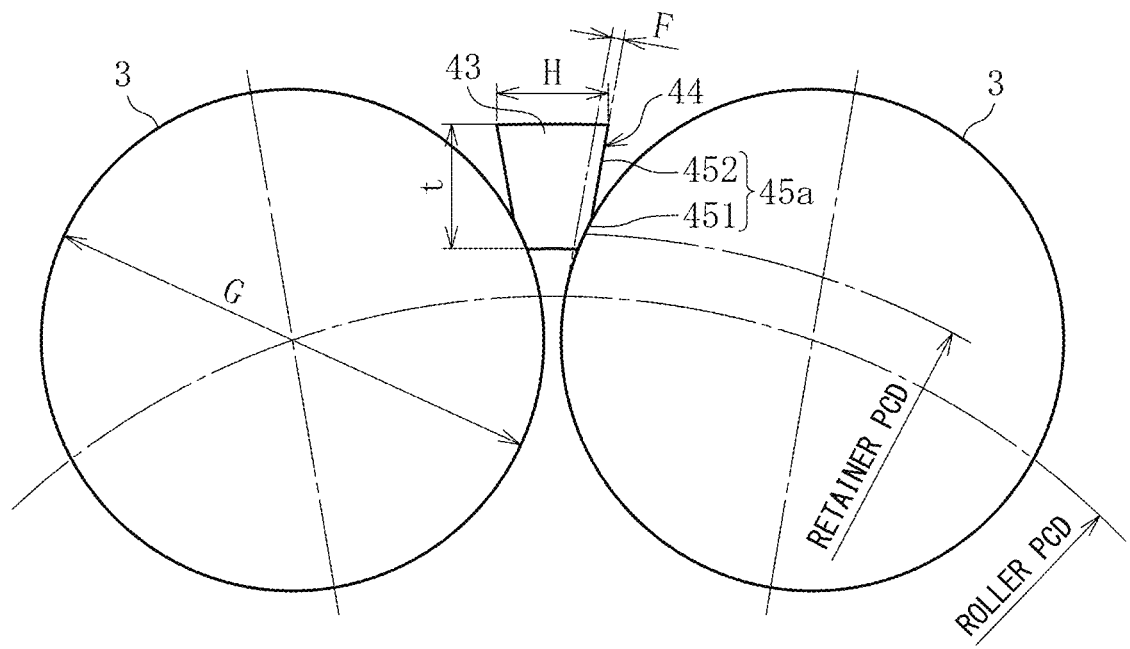
FIG. 17 is a sectional view taken along the line i-i in FIG. 16.
Figure 18:
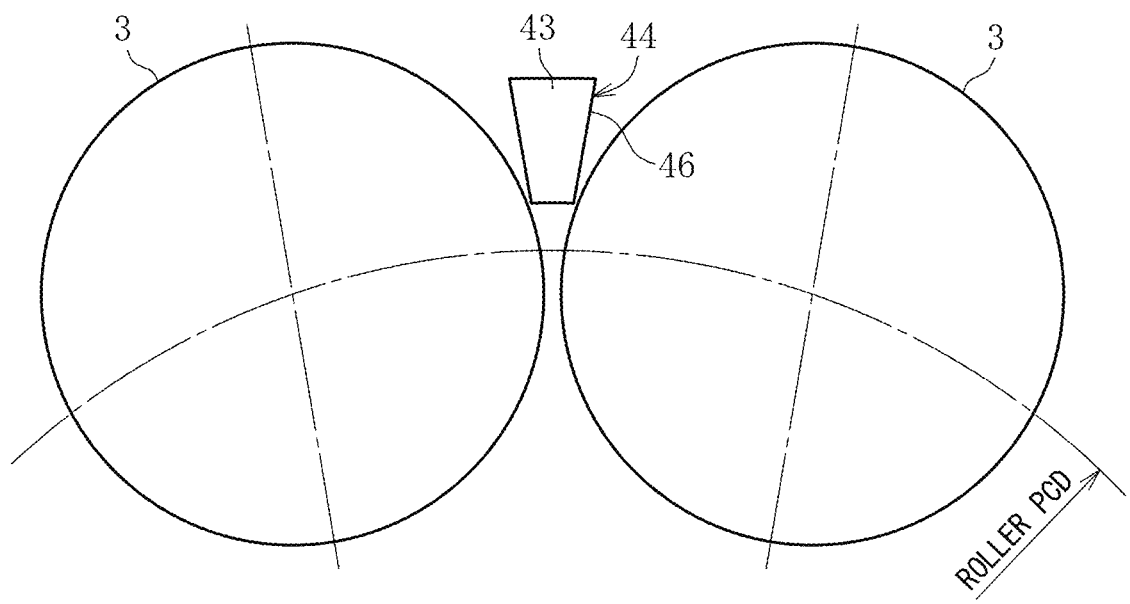
FIG. 18 is a sectional view taken along the line ii-ii in FIG. 16.

FIG. 16 is a sectional view of the retainer 4 made of resin in the another embodiment as seen in the axial direction. FIG. 17 is a sectional view taken along the line i-i in FIG. 16. FIG. 18 is a sectional view taken along the line ii-ii in FIG. 16.

As illustrated in FIG. 16, the retainer 4 integrally comprises a small-diameter-side annular portion 41, a large-diameter-side annular portion 42, and a plurality of pillar portions 43 connecting the small-diameter-side annular portion 41 and the large-diameter-side annular portion 42 to each other. The retainer 4 has pockets 44 each having a trapezoidal shape. The pockets 44 are each defined by the small-diameter-side annular portion 41, the large-diameter-side annular portion 42, and pillar portions 43 adjacent to each other in the circumferential direction, and are configured to receive the tapered rollers 3.

As illustrated in FIG. 16, side surfaces 43a of the pillar portion 43 each have two projecting portions 45a and 45b projecting into the pocket 44. The projecting portions 45a and 45b are formed so as to be separated apart from the small-diameter-side annular portion 41 and the large-diameter-side annular portion 42 in an axial direction of the tapered roller 3, respectively (hereinafter referred to as "roller axis direction"). Specifically, the projecting portion 45a on the large-diameter side is formed so as to be separated apart from the large-diameter-side annular portion 42 toward the retainer small-diameter side in the roller axis direction. The projecting portion 45b on the small-diameter side is formed so as to be separated apart from the small-diameter-side annular portion 41 toward the retainer large-diameter side in the roller axis direction. That is, all of the projecting portions 45a and 45b are formed so as to be independently separated apart from the small-diameter-side annular portion 41 and the large-diameter-side annular portion 42. Moreover, the projecting portion 45a on the large-diameter side and the projecting portion 45b on the small-diameter side are formed so as to be separated apart from each other in the roller axis direction. Three or more projecting portions may be formed on each side surface 43a of the pillar portion.

As illustrated in FIG. 16 and FIG. 17, the distal end surface of each of the projecting portions 45a and 45b comprises a region 451 on the radially inner side and a region 452 on the radially outer side. The distal end surface of the large-diameter-side projecting portion 45a and the distal end surface of the small-diameter-side projecting portion 45b have the same shape. The region 451 on the radially inner side of each of the projecting portions 45a and 45b forms a guide surface which is brought into contact with a tapered outer peripheral surface of the tapered roller 3. In FIG. 17, illustration is given of a case in which the guide surface 451 is formed into an arc-surface shape adaptable to the outer peripheral surface of the tapered roller 3. However, the guide surface 451 may be formed into a flat straight surface. The region 452 on the radially outer side is formed into a straight surface, which is inclined at an angle with respect to the region 451 on the radially inner side and extends in a direction parallel to the movement track of the tapered roller 3 that is given when the tapered roller 3 is moved in a radial direction of the bearing. The retainer PCD is larger than the roller PCD, and an entire region of the cross section of the pillar portion 43 is formed on the radially outer side with respect to the roller PCD.

In the side surface 43a of the pillar portion 43, as illustrated in FIG. 18, a region 46 excluding the projecting portions 45a and 45b is a non-contact portion which does not guide the tapered outer peripheral surface of the tapered roller 3 or is not held in contact with the tapered outer peripheral surface of the tapered roller 3. For example, the non-contact portion 46 is formed into a straight surface which is parallel to the movement track of the tapered roller 3 that is given when the tapered roller 3 is moved in the radial direction of the bearing. Thus, in this embodiment, the non-contact portion 46 and the region 452 on the radially outer side of each of the projecting portions 45a and 45b are formed in parallel.

The retainer 4 is formed by injection molding with a resin material. The pockets of the retainer 4 are also formed with a mold. Therefore, all of the portions of the inner wall surface of the pocket 44 (including the distal end surfaces of the projecting portions 45a and 45b and the non-contact portion 46) are molded surfaces formed with a mold. As the resin material, it is preferred that, for example, PPS or polyamide (PA46, PA66, or the like) be employed in consideration of aggression of an additive contained in the lubricating oil with respect to the resin material.

FIG. 19A and FIG. 19B are sectional views for illustrating an assembling step for the tapered roller bearing comprising the retainer 4 made of resin described above.

At the time of assembling of the tapered roller bearing, as illustrated in FIG. 19A, the retainer 4 is first arranged on an outer periphery of the inner ring 1. At this time, a minimum inner-diameter dimension of the small-diameter-side annular portion 41 of the retainer 4 is larger than an outer-diameter dimension of the small-diameter-side flange portion 13 of the inner ring 1, and a gap $\beta$ is defined between the inner peripheral surface of the small-diameter-side annular portion 41 of the retainer 4 and the outer peripheral surface of the small-diameter-side flange portion 13. Thus, the retainer 4 can be arranged on the outer periphery of the inner ring 1 without any interference.

After that, as illustrated in FIG. 19B, the tapered roller 3 is received in the pocket 44 of the retainer 4 by force-fitting. Specifically, the tapered roller 3 having been inserted into the pocket 44 from the radially outer side of the retainer 4 is pressed against the projecting portions 45a and 45b, and the projecting portions 45a and 45b and the pillar portion 43 are elastically deformed to increase a distance in the circumferential direction between the projecting portions 45a, 45b which are opposed to each other in the pocket. After the tapered roller 3 passes through a space defined between the projecting portions 45a, 45b opposed to each other in the circumferential direction, the projecting portions 45a and 45b and the pillar portion 43 are elastically restored to an original shape. When the tapered roller 3 is arranged on an inner raceway surface 11, the guide surfaces 451 of the projecting portions 45a and 45b are brought closer to the outer peripheral surface of the tapered roller 3, thereby regulating removal of the tapered roller 3 in the radially outward direction by the projecting portions 45a and 45b.

In order to allow the force-fitting of the tapered roller 3, as illustrated in FIG. 17, the projecting portions 45a and 45b each have a force-fit margin F. The force-fit margin F corresponds to a maximum displacement amount of each of the distal end surfaces 451 and 452 of the projecting portions 45a and 45b at the time of force-fitting the tapered roller 3 into the pocket 44, with the state in which the tapered roller 3 is received in the pocket 44 as a reference. At least the projecting portions 45a and 45b and the pillar portion 43 are designed so that elastic deformation by the amount corresponding to the force-fit margin F occurs on both sides in the circumferential direction at the time of force-fitting. In a case of a retainer made of resin to be used for a tapered roller bearing for an automobile such as a tapered roller bearing for a differential gear device or a transmission device, the force-fit margin F of the projecting portions 45a and 45b has a suitable range of equal to or larger than 0.20 mm and equal to or smaller than 0.50 mm.

In order to allow the elastic deformation of the projecting portions 45a and 45b and the pillar portion 43 at the time of force-fitting, it is preferred that the force-fitting of the tapered roller 3 be performed only at one location in the circumferential direction each time. That is, after the force-fitting of one tapered roller 3 is completed, the retainer 4 is rotated by the amount corresponding to one pitch, and then force-fitting of the tapered roller 3 at another stage be performed at the same location. Subsequently, this operation is repeated to sequentially force-fit all of the tapered rollers 3 into the pockets 44 of the retainer 4. At this time, a plurality of tapered rollers 3 which are sufficiently separated apart from one another in the circumferential direction may be simultaneously force-fitted into the retainer 4. As a matter of course, when there arises no particular problem, all of the tapered rollers 3 can be simultaneously force-fitted to the pockets of the retainer 4.

After all of the tapered rollers 3 are retained by the retainer 4 through force-fitting of the tapered rollers 3, the assembly illustrated in FIG. 19B comprising the inner ring 1, the tapered rollers 3, and the retainer 4 is completed. After that, the outer ring 2 is arranged on the radially outer side of the assembly, thereby completing the tapered roller bearing illustrated in FIG. 15.

The tapered roller bearing according to the another embodiment described above also has a unique feature in that, at the time of assembling of the tapered roller bearing, the tapered rollers 3 can be force-fitted to the pockets 44 of the retainer 4 from the radially outer side. When the retainer is made of resin, the retainer 4 is more likely to be elastically deformed at the time of force-fitting of the tapered roller 3. Thus, ease of operation at the time of force-fitting is improved. In particular, according to the embodiment of the present invention, the projecting portions 45a and 45b are separated apart from the small-diameter-side annular portion 41 and the large-diameter-side annular portion 42 of the retainer 4 in the roller axis direction, and the projecting portion 45a on the large-diameter side and the projecting portion 45b on the small-diameter side are separated apart from each other in the roller axis direction. Thus, an area (in particular, length in the roller axis direction) of each of the distal end surfaces 451 and 452 of the projecting portions 45a and 45b is small. Therefore, the projecting portions 45a and 45b and the pillar portion 43 can easily be elastically deformed. Thus, the resistance given at the time of force-fitting is alleviated, and hence the force-fitting of the tapered roller 3 can be performed smoothly. At the time of force-fitting, the tapered roller 3 slides relative to the projecting portions 45a and 45b. However, such sliding is performed with respect to the resin components. Thus, as compared to the case in which the tapered roller slides relative to the steel components (small-diameter-side flange portion of the inner ring) as described in Patent Literature 2, the damage on the surface of the tapered roller can be prevented.

Moreover, the projecting portions 45a and 45b are arranged on both sides across an intermediate point of the tapered roller 3 in the roller axis direction. Therefore, skew of the tapered roller 3 to be guided by the guide surfaces 451 is prevented, thereby being capable of stabilizing the posture of the tapered roller 3.

As described above, the force-fitting of the tapered rollers 3 to the retainer pockets 44 can be performed. Thus, at the time of assembling of the bearing, as illustrated in FIG. 19A and FIG. 19B, there may be employed an assembling procedure such as force-fitting the tapered rollers 3 from the radially outer side of the retainer 4 under the state in which the retainer 4 is arranged on the outer peripheral side of the inner ring 1. Thus, the caulking step for the retainer 4, which is required at the time of assembling of the bearing which uses the retainer formed of a steel plate is not required. Therefore, the contact failure which occurs between the tapered roller 3 and the inner surface of the pocket 44 due to residual deformation caused at the time of caulking canbe prevented, thereby being capable of stabilizing the bearing performance.

Moreover, in the retainer formed of a steel plate, in order to prevent deformation of the pillar portion due to punching resistance generated in the pocket punching step, it is required that the cross section of the pillar portion in the radial direction be formed into a flat shape having a small thickness "t" (cross-section height) in the radial direction with respect to a width dimension H (pillar width) in the circumferential direction. Therefore, the retainer formed of a steel plate is designed so as to satisfy H/t≥0.5. However, due to such limitation, there has been a problem in that it is difficult to enhance the roller filling ratio in the retainer formed of a steel plate.

In contrast, the retainer made of resin in this embodiment has the pockets 44 molded therein. Thus, in view of the punching resistance, it is not required that the pillar width H or the cross-section height "t" be determined. Thus, the pillar width H can be set relatively small with setting satisfying the relationship of H/t<1.5. With this, the roller filling ratio can be increased to achieve a high load capacity of the bearing. A roller filling ratio γ [%] can be calculated with γ=(Z×G× 100)/(π×PCD), where Z represents the number of rollers, G represents a roller diameter, and PCD represents a roller pitch circle diameter. The pillar width H corresponds to a width dimension in the circumferential direction in the region of the pillar portion 43 including the projecting portions 45a and 45b.

FIG. 20 is a table for showing a relationship of a value of H/t, a sectional shape of the pillar portion 43, and a roller filling ratio. As illustrated in FIG. 20, as a value of H/t is smaller, the sectional shape of the pillar portion is elongated. Moreover, as a value of H/t is smaller, the roller filling ratio can be increased. It can be understood that the roller filling ratio of equal to or larger than 90% can be achieved through setting to H/t<1.5 as in the present invention.

In addition, there is employed a structure in which some regions in the roller axis direction of the side surface 43a of the pillar portion 43 of the retainer 4 serve as guide surfaces 451 to be brought into contact with the outer peripheral surface of the tapered rollers 3. Thus, as compared to the case in which the guide surface is formed over an entire length of the side surface 43a in the roller axis direction, shear torque of the lubricating oil between the tapered roller 3 and the pillar portion 43 can be reduced. Thus, reduction in torque of the bearing can be achieved.

Figure 21:
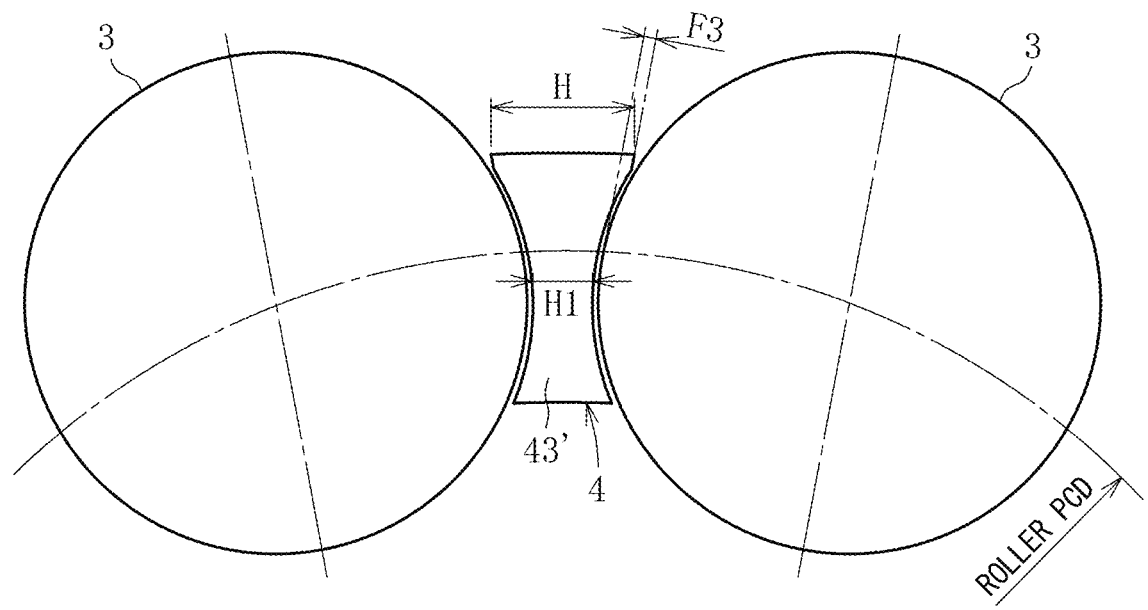
FIG. 21 is a sectional view for illustrating a state after force-fitting of tapered rollers.

It is preferred that, as illustrated in FIG. 17 and FIG. 18, the pillar portion 43 of the retainer made of resin be arranged on the radially outer side with respect to the roller PCD. As illustrated in FIG. 21, in the retainer 4 made of resin in which a pillar portion 43' is provided on the roller PCD, it is required that, in order to secure the strength of the retainer 4, a pillar width H1 on the roller PCD be set larger to some extent regardless of a force-fit margin F3. Thus, there is a limit in increase in roller filling ratio. In contrast, when the pillar portion 43 of the retainer is arranged on the radially outer side with respect to the roller PCD, such inconvenience can be prevented, and the roller filling ratio can easily be increased.

Figure 22:
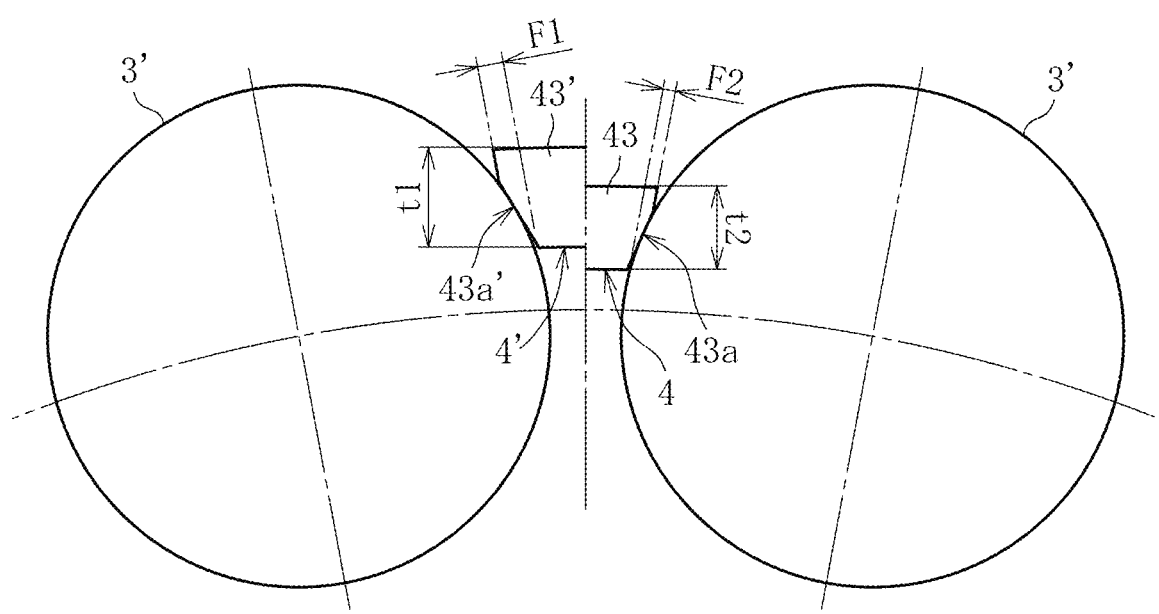
FIG. 22 is a sectional view for illustrating a state after force-fitting of the tapered rollers.

In the retainer formed of a steel plate (caulking type) in the related art, the pillar portion 43' has a sectional shape as illustrated on the left side of FIG. 22. When a projecting portion 43a' having a force-fit margin F1 is provided to a retainer 4' as it is, the force-fit margin F1 increases, with the result that force-fitting of a tapered roller 3' becomes more difficult. As a countermeasure for such case, as illustrated on the right side in FIG. 22, it is conceivable to set the pitch circle diameter (PCD) of the retainer 4 to be smaller to reduce a force-fit margin F2. However, when the pitch circle diameter is to be reduced while maintaining the relationship of H/t≥1.5, it is inevitably required to reduce a cross-section height t2 of the pillar portion 43, with the result that the strength of the retainer 4 becomes insufficient. In contrast, in the retainer made of resin according to the embodiment of the present invention, the relationship of H/t<1.5 is satisfied. Therefore, while an appropriate force-fit margin is secured, the cross-section height "t" can be set relatively large, thereby being capable of securing sufficient strength of the retainer 4.

Also in the tapered roller bearing according to the second embodiment described above, the logarithmic crowning can be used as the crowning of the tapered rollers 3 (see FIG. 9 and FIG. 10).

Now, with reference to FIG. 11 and FIG. 17, description is made of dimensions of components of the retainer made of resin which are preferred in view of attaining the effect described above.

(1) Relationship between Width A of Guide Surface and Pocket Entire Width B

As illustrated in FIG. 11, under a condition in which a width in the roller axis direction of the guide surface 451, which is configured to guide the tapered roller 3 (width in the roller axis direction is hereinafter simply referred to as "width") is represented by A, and the entire width of the pocket is represented by B, it is preferred that the ratio B/A of the pocket entire width B to the width A of the guide surface be set within the range of B/A=4.5 to 20. When the ratio B/A is smaller than 4.5, the force-fitting resistance becomes excessively larger, with the result that defects such as cracks in the pillar portion 43 may occur. When the ratio B/A is larger than 20, there is a risk in that the roller removal may occur, or the roller damage may occur during operation of the bearing.

(2) Relationship between Width C of Center Portions of Guide Surfaces and Pocket Entire width B As illustrated in FIG. 11, under the condition in which the width of center portions in the roller axis direction of the guide surfaces 451 of the projecting portions 45a and 45b is represented by C, and the entire width of the pocket 44 is represented by B, it is preferred that the ratio C/B of the width C of the center portions of the guide surfaces to the pocket entire width B be set within the range of C/B=0.5 to 0.9. When the ratio C/B is smaller than 0.5, the guide surfaces 451 are intensively arranged near the center in the roller axis direction, and the limitation on the inclination of the roller during operation of the bearing becomes smaller, with the result that the roller damage occurs. Meanwhile, the ratio C/B exceeds 0.9, the roller removal becomes more liable to occur.

(3) Relationship between Roller Diameter G and Force-fit Margin F

It is preferred that the ratio G/F of the roller diameter G to the force-fit margin F illustrated in FIG. 17 be within the range of from 30 to 50. When the force-fit margin F is excessively large, the damage on the pillar portion 43 or the frequency of occurrence of the roller damage increases. When the force-fit margin F is excessively small, the problem of the roller removal may arise. The term "roller diameter" described above corresponds to an arithmetic mean value of diameters when it is assumed that the large end and the small end of the roller have no chamfer.

Figure 23:
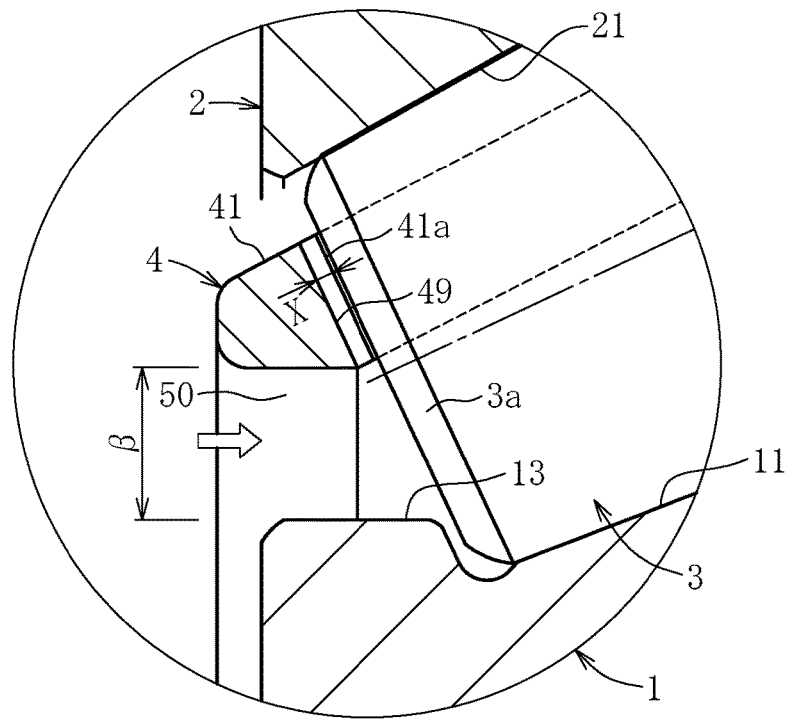
FIG. 23 is an enlarged sectional view of the tapered roller bearing on a small-diameter-end side of the retainer.

Also in the retainer made of resin described above, the measure to reduce the torque described above (FIG. 13 and FIG. 14) can be employed to achieve the reduction in torque of the tapered roller bearing. That is, as illustrated in FIG. 13, a cutout 49 is formed in the inner surface of the pocket of the small-diameter-side annular portion 41 of the retainer 4. With this, as illustrated in FIG. 23, part of the lubricating oil having flowed into the bearing through a gap 50 is moved by a centrifugal force toward the outer ring 2 side through the cutout 49 and flows along an outer raceway surface 21. The outer ring 2 has no flange portion configured to interrupt the flow of the lubricating oil, and hence the lubricating oil can smoothly flow along the outer raceway surface 21. Thus, the torque loss due to the flow resistance of the lubricating oil can be reduced by reducing the amount of lubricating oil flowing along the inner raceway surface 11 to reduce the amount of lubricating oil stagnating inside the bearing.

In order to attain the effect described above, it is preferred that a depth X of the cutout 49 be set so as to be equal to or larger than 0.1 mm to allow a sufficient amount of lubricating oil to flow into the outer ring 2 side. Moreover, it is preferred that a width β of the gap 50 defined between the inner peripheral surface of the small-diameter-side annular portion 41 of the retainer 4 and the outer peripheral surface of the small-diameter-side flange portion 13 of the inner ring 1 be set to 2.0% or less of the outer-diameter dimension of the small-diameter-side flange portion 13 of the inner ring 1.

In the description above, as a usage of the tapered roller bearing, an example is given of the case in which the tapered roller bearing is used for supporting a power transmission shaft in a differential gear device and a transmission device of an automobile. However, the usage of the tapered roller bearing is not limited to this, and the tapered roller bearing can be widely used as a bearing for supporting various types of shafts to be mounted to an automobile or an industrial machine.

The invention claimed is:
1. A tapered roller bearing, comprising:
an inner ring having an inner raceway surface formed on an outer peripheral surface thereof;
an outer ring having an outer raceway surface formed on an inner peripheral surface thereof;
a plurality of tapered rollers arranged between the inner raceway surface of the inner ring and the outer raceway surface of the outer ring; and
a retainer configured to retain the tapered rollers at a plurality of positions in a circumferential direction,
wherein the retainer comprises:
 a small-diameter-side annular portion;
 a large-diameter-side annular portion; and
 a plurality of pillar portions connecting the small-diameter-side annular portion and the large-diameter-side annular portion to each other,
wherein the small-diameter-side annular portion, the large-diameter-side annular portion, and the plurality of pillar portions define a plurality of pockets in which the tapered rollers are received, each of the pockets being located between an adjacent pair of the plurality of pillar portions,
wherein each of the plurality of pillar portions has a side surface with a plurality of projecting portions formed thereon that are separated apart from each other and both of the small-diameter-side annular portion and the large-diameter-side annular portion in a roller axis direction and are configured to guide one of the tapered rollers on distal end surfaces thereof,
wherein the projecting portions each have a force-fit margin F, wherein side surfaces of the adjacent pairs of the plurality of pillar portions that face each other in a circumferential direction include non-contact portions, the non-contact portions being free from contact with a tapered outer peripheral surface of one of the tapered rollers located therebetween, wherein, for each of the adjacent pairs of the plurality of pillar portions, in cross-section in a direction perpendicular to the roller axis direction, the non-contact portions facing each other in the circumferential direction are separated by a distance that is larger than a diameter of the one of the tapered rollers located therebetween along an entire width of the non-contact portions, and wherein a distance between centers of guide surfaces of the projection portions adjacent to each other on the side surface of one of the plurality of pillar portions as a width C and an entire width B of one of the pockets are set so as to satisfy a relationship of C/B=0.45 to 0.55.

2. The tapered roller bearing according to claim 1, wherein a guide portion formed of a fracture surface is formed on a radially outer side of each of the distal end surfaces of the projecting portions, the fracture surfaces each having a roughness surface on which crystal grains appear.

3. The tapered roller bearing according to claim 1, wherein a radially inner side of each of the distal end surfaces of the projecting portions is formed of a molded surface.

4. The tapered roller bearing according to claim 1, wherein a width A of one of the projecting portions and the entire width B of one of the pockets are set so as to satisfy a relationship of B/A=4.5 to 20.

5. The tapered roller bearing according to claim 1, wherein the force-fit margin F is set so as to be equal to or larger than 0.05 mm and equal to or smaller than 0.30 mm.

6. The tapered roller bearing according to claim 1, wherein the force-fit margin F and a roller diameter G are set so as to satisfy a relationship of G/F=30 to 50.

7. The tapered roller bearing according to claim 1, wherein the retainer is formed of a steel plate.

8. The tapered roller bearing according to claim 1, wherein a logarithmic crowning is used as a crowning of the tapered rollers.

9. The tapered roller bearing according to claim 1,
wherein the retainer is made of resin, and
wherein a cross-section height "t" and a pillar width H of the pillar portions satisfy a relationship of H/t<1.5.

10. The tapered roller bearing according to claim 9, wherein the pillar portions of the retainer are arranged on a radially outer side with respect to a roller pitch circle.

11. The tapered roller bearing according to claim 9, wherein a width A of one of the projecting portions and the entire width B of one of the pockets are set so as to satisfy a relationship of B/A=4.5 to 20.

12. The tapered roller bearing according to claim 9, wherein the force-fit margin F is set so as to be equal to or larger than 0.20 mm and equal to or smaller than 0.50 mm.

13. The tapered roller bearing according to claim 9, wherein the force-fit margin F and a roller diameter G are set so as to satisfy a relationship of G/F=30 to 50.

14. The tapered roller bearing according to claim 9, wherein a roller filling ratio $\gamma[\%]$ defined by $\gamma=(Z \times G)/(\pi \times PCD)$ is set so as to satisfy $\gamma>90$, where Z represents the number of tapered rollers, G represents a roller diameter, and PCD represents a roller pitch circle diameter.

15. The tapered roller bearing according to claim 9, wherein a logarithmic crowning is used as a crowning of the tapered rollers.

16. A tapered roller bearing, comprising:
an inner ring having an inner raceway surface formed on an outer peripheral surface thereof;
an outer ring having an outer raceway surface formed on an inner peripheral surface thereof;
a plurality of tapered rollers arranged between the inner raceway surface of the inner ring and the outer raceway surface of the outer ring; and
a retainer configured to retain the tapered rollers at a plurality of positions in a circumferential direction,
wherein the retainer comprises:
a small-diameter-side annular portion;
a large-diameter-side annular portion; and
a plurality of pillar portions connecting the small-diameter-side annular portion and the large-diameter-side annular portion to each other,
wherein the small-diameter-side annular portion, the large-diameter-side annular portion, and the plurality of pillar portions define a plurality of pockets in which the tapered rollers are received, each of the pockets being located between an adjacent pair of the plurality of pillar portions,
wherein each of the plurality of pillar portions has a side surface with a plurality of projecting portions formed thereon that are separated apart from each other and both of the small-diameter-side annular portion and the large-diameter-side annular portion in a roller axis direction and are configured to guide one of the tapered rollers on distal end surfaces thereof,
wherein the projecting portions each have a force-fit margin F,
wherein side surfaces of the adjacent pairs of the plurality of pillar portions that face each other in a circumferential direction include non-contact portions, the non-contact portions being free from contact with a tapered outer peripheral surface of one of the tapered rollers located therebetween,
wherein, for each of the adjacent pairs of the plurality of pillar portions, in cross-section in a direction perpendicular to the roller axis direction, the non-contact portions facing each other in the circumferential direction are separated by a distance that is larger than a diameter of the one of the tapered rollers located therebetween along an entire width of the non-contact portions, and
wherein a guide portion formed of a fracture surface is formed on a radially outer side of each of the distal end surfaces of the projecting portions, the fracture surfaces each having a roughness surface on which crystal grains appear.

17. A tapered roller bearing, comprising:
an inner ring having an inner raceway surface formed on an outer peripheral surface thereof;
an outer ring having an outer raceway surface formed on an inner peripheral surface thereof;
a plurality of tapered rollers arranged between the inner raceway surface of the inner ring and the outer raceway surface of the outer ring; and
a retainer configured to retain the tapered rollers at a plurality of positions in a circumferential direction,
wherein the retainer comprises:
a small-diameter-side annular portion;
a large-diameter-side annular portion; and a plurality of pillar portions connecting the small-diameter-side annular portion and the large-diameter-side annular portion to each other, wherein the small-diameter-side annular portion, the large-diameter-side annular portion, and the plurality of pillar portions define a plurality of pockets in which the tapered rollers are received, each of the pockets being located between an adjacent pair of the plurality of pillar portions, wherein each of the plurality of pillar portions has a side surface with a plurality of projecting portions formed thereon that are separated apart from each other and both of the small-diameter-side annular portion and the large-diameter-side annular portion in a roller axis direction and are configured to guide one of the tapered rollers on distal end surfaces thereof, wherein the projecting portions each have a force-fit margin F, wherein side surfaces of the adjacent pairs of the plurality of pillar portions that face each other in a circumferential direction include non-contact portions, the non-contact portions being free from contact with a tapered outer peripheral surface of one of the tapered rollers located therebetween, wherein, for each of the adjacent pairs of the plurality of pillar portions, in cross-section in a direction perpendicular to the roller axis direction, the non-contact portions facing each other in the circumferential direction are separated by a distance that is larger than a diameter of the one of the tapered rollers located therebetween along an entire width of the non-contact portions, wherein the retainer is made of resin, and wherein a cross-section height "t" and a pillar width H of the pillar portions satisfy a relationship of H/t<1.5.

18. The tapered roller bearing according to claim 17, wherein a distance between centers of guide surfaces of the projection portions adjacent to each other on the side surface of one of the plurality of pillar portions as a width C and an entire width B of one of the pockets are set so as to satisfy a relationship of C/B=0.5 to 0.9.

* * * * *